United States Patent
Iwata et al.

(10) Patent No.: US 9,057,449 B2
(45) Date of Patent: Jun. 16, 2015

(54) FLUID CONTROL VALVE

(71) Applicant: CKD CORPORATION, Komaki-shi, Aichi (JP)

(72) Inventors: Hiroki Iwata, Kasugai (JP); Akinori Uraki, Kasugai (JP); Hideyuki Takeda, Kasugai (JP)

(73) Assignee: CKD CORPORATION, Aichi (JP)

( * ) Notice: Subject to any disclaimer, the term of this patent is extended or adjusted under 35 U.S.C. 154(b) by 296 days.

(21) Appl. No.: 13/688,934

(22) Filed: Nov. 29, 2012

(65) Prior Publication Data

US 2013/0140480 A1 Jun. 6, 2013

(30) Foreign Application Priority Data

Dec. 2, 2011 (JP) ................. 2011-264348
Nov. 1, 2012 (JP) ................. 2012-242155

(51) Int. Cl.
F16K 27/00 (2006.01)
F16K 27/02 (2006.01)

(52) U.S. Cl.
CPC ............... *F16K 27/00* (2013.01); *F16K 27/003* (2013.01); *F16K 27/02* (2013.01)

(58) Field of Classification Search
CPC ........ F16K 27/00; F16K 27/003; F16K 27/02
USPC .......................... 251/331–333, 359
See application file for complete search history.

(56) References Cited

U.S. PATENT DOCUMENTS

| 2001/0019116 A1* | 9/2001 | Fukano et al. .............. 251/63.6 |
| 2001/0035507 A1* | 11/2001 | Tokuda et al. .............. 251/63.5 |
| 2008/0116412 A1 | 5/2008 | Masamura et al. |

FOREIGN PATENT DOCUMENTS

| CN | 101072964 A | 11/2007 |
| JP | A-9-4734 | 1/1997 |
| JP | A-11-51239 | 2/1999 |
| JP | A-2001-153261 | 6/2001 |
| JP | A-2002-13657 | 1/2002 |
| JP | A-2010-1925 | 1/2010 |
| JP | A-2010-253856 | 11/2010 |
| JP | A-2010-269472 | 12/2010 |

(Continued)

OTHER PUBLICATIONS

Office Action issued in Korean Patent Application No. 10-2012-0138017 dated Nov. 29, 2013 (with translation).

(Continued)

*Primary Examiner* — John K Fristoe, Jr.
*Assistant Examiner* — Daphne M Barry
(74) *Attorney, Agent, or Firm* — Oliff PLC

(57) ABSTRACT

A fluid control valve includes: a resin valve main body including inlet and outlet ports in opposite side surfaces, a valve chamber communicating between the inlet and outlet ports and opening at the upper surface center of the main body, and a valve seat provided in an inner wall of the chamber; a valve element movable into or out of contact with the valve seat; and a valve upper body including a drive part to drive the valve element. An inflow passage is formed like an L shape extending through the inner wall to communicate between the inlet port and the chamber via the valve seat. The inner wall is cylindrical having a thick-wall portion to have a wall thickness thicker on the inlet port side than on the outlet port side. The valve main body is provided, at a center of a lower surface, with a resin injected part.

12 Claims, 20 Drawing Sheets

(56) References Cited

FOREIGN PATENT DOCUMENTS

| | | |
|---|---|---|
| JP | A-2011-122718 | 6/2011 |
| KR | 10-0889577 | 3/2009 |

OTHER PUBLICATIONS

Jan. 7, 2014 Office Action issued in Japanese Patent Application No. 2012-242155 (with English translation).

* cited by examiner

FLUID CONTROL VALVE

CROSS-REFERENCE TO RELATED APPLICATIONS

This application is based upon and claims the benefit of priority from the prior Japanese Patent Applications Nos. 2011-264348 filed on Dec. 2, 2011 and 2012-242155 filed on Nov. 1, 2012, the entire contents of which are incorporated herein by reference.

BACKGROUND OF THE INVENTION

1. Field of the Invention

The present invention relates to a fluid control valve to be used in a semiconductor manufacturing device, in particular, relates to a chemical fluid control valve including a resin valve main body.

2. Related Art

For instance, as shown in FIG. 22, a chemical fluid control valve 200 to be used in a semiconductor manufacturing device includes: a resin valve main body 210 including a valve chamber 215 providing communication between an inlet port 211 and an outlet port 212 formed in opposite side surfaces via a valve seat 261, the valve chamber 215 opening at the center of an upper surface, and the valve seat 261 provided in an inner wall 216 defining the valve chamber 215; a diaphragm valve element 241 configured to come into or out of contact with the valve seat 261; and a valve upper body 220 having a drive section for driving the diaphragm valve element 241. The main body 210 is formed with an inflow passage 213 formed like an L shape extending through the inner wall 216 to communicate the inlet port 211 with the valve chamber 215. In manufacture of such a main body 210 by injection molding, when a resin flow is branched in two or more directions and, after flowing by a certain distance, the branched flows merge again. In this merging area, weld lines are apt to occur. Weld lines occur when molten resin solidifies before completely fuses. Thus, the area where weld lines occur may lack sufficient mechanical strength and cause fluid leakage.

In the resin valve main body 210, accordingly, in the case where weld lines occur in the valve seat 261 with which the diaphragm valve element 241 comes into or out of contact, a seal portion 217 that seals a retainer portion of the valve element 241, and others, the valve main body 210 after molding is conventionally subjected to cutting, grinding, and others to remove the weld lines.

However, the cutting and others after molding are not preferable due to cost increase and also have a problem that burrs and dust generated in the cutting are left in the valve and may become particles in a semiconductor manufacturing process.

To solve the above problems, for example, Patent Documents 1 to 3 disclose techniques to avoid the weld lines without using cutting or the like.

Patent Document 1 discloses a method for molding resin components by making resin flows merge in a cavity while keeping a molten state. In this method, a cavity mold is arranged to be removable from a mold main unit so that the cavity mold is heated and cooled in a short time. Accordingly, the cavity mold can be heated and cooled in a short time. This configuration can prevent the generation of weld lines without using extra energy.

Patent Document 2 discloses a valve seat processing method in which a flat contact surface of a heated heating member is pressed against a valve seat serving as a seal surface of a resin valve, thereby melting the valve seat, and then the contact surface of the heating member is separated from the valve seat. According to this processing method, the seal surface of the valve seat is melted and made flat along the contact surface of the heating member, thus removing molding defects such as weld lines.

Patent Document 3 discloses a method for manufacturing a cylindrical part by supplying molten resin to fill a runner annularly formed along the outside of a part forming section, and the molten resin filled in the runner is made to flow into the part forming section from the outer periphery side thereof. In this manufacturing method, the molten resin is supplied to uniformly flow from the runner to the outside of the part forming section, and thus the molten resin flows radially inwardly from outside to inside of the part forming section. Accordingly, the part forming section does not have an area where the molten resin branched into two flow directions join together. Thus, no weld lines occur.

RELATED ART DOCUMENTS

Patent Documents

Patent Document 1: JP-A-2010-269472
Patent Document 2: JP-A-2011-122718
Patent Document 3: JP-A-2010-253856

SUMMARY OF INVENTION

Problems to be Solved by the Invention

However, the techniques disclosed in Patent Documents 1 to 3 have the following problems.

In Patent Document 1, the cavity mold is set removably in the mold main unit, the number of gates is increased in correspondence with divided mold sections, leading to quality degradation such as sink marks and breakage. Such divided structure of the mold inevitably leads to an increase in mold cost.

In Patent Document 2, the flat contact surface of the heated heating member is pressed against the valve seat of the resin valve after molding, thereby melting the valve seat again. This remelting and cooling takes long and thus decreases productivity. Furthermore, facilities need a complicated structure and control to drive the heating member. This leads to an increase in facility cost.

In Patent Document 3, the runner has to be provided annularly along the outside of the part forming section. This lowers a yield of resin.

The present invention has been made to solve the above problems and has a purpose to provide a fluid control valve including a valve main body configured to avoid the generation of weld lines in a seal surface without using a special mold structure.

Means of Solving the Problems

To achieve the above purpose, one aspect of the invention provides a fluid control valve comprising: a resin valve main body including an inlet port and an outlet port formed in opposite side surfaces of the valve main body, a valve chamber communicating between the inlet port and the outlet port and opening at a center of an upper surface of the valve main body, and a valve seat provided in an inner wall of the valve chamber; a valve element arranged to be moved into or out of contact with the valve seat; and a valve upper body including a drive part to drive the valve element, an inflow passage being formed like an L shape extending through the inner wall to communicate between the inlet port and the valve chamber via the valve seat, wherein the inner wall is shaped in a cylindrical form including a thick-wall portion so that a wall thickness of the inner wall is thicker on the inlet port side than on the outlet port side, and the valve main body is provided, at a center of a lower surface, with a resin injected part.

According to the above configuration, the valve main body is configured to avoid the generation of weld lines in the valve seat without using a special mold structure.

To be concrete, the inflow passage is formed like an almost L shape extending through the inner wall to communicate between the inlet port and the valve chamber via the valve seat. Thus, of the molten resin flowing in the cavity for the valve main body, the resin flowing from the resin injected part toward the inlet port side of the inner wall is interfered by the inflow passage and hence caused to flow slower than the resin flowing toward the outlet port side of the inner wall which is not interfered by the passage.

However, the inner wall provided with the valve seat is formed in the cylindrical shape having the thick-wall portion so that the wall thickness of the inner wall is thicker on the inlet port side than on the outlet port side. Thus, the molten resin flowing in the thick-wall portion is less influenced by an increase in viscosity resistance due to temperature decrease. In the cavity for the inner wall, therefore, the resin velocity is relatively faster on the inlet port side than on the outlet port side.

Accordingly, when the molten resin flowing on the inlet port side is passing through the thick-wall portion, this resin catches up on the molten resin flowing on the outlet port side, and the resin flows merge in the cylindrical cavity for the inner wall, and then the merged flow can reach the valve seat which is the seal surface. Therefore, after the molten resin passes through the thick-wall portion, the molten resin on the inlet port side and the molten resin on the outlet port side can join together and simultaneously fill the cylindrical cavity for the inner wall.

As a result, when the molten resin flowing on the inlet port side merges with the molten resin flowing on the outlet port side in the cylindrical cavity forming the inner wall, even if weld lines occur in a merging area, the weld lines can be eliminated by further molten resin subsequently supplied together in the cylindrical cavity for the inner wall.

Therefore, the valve main body having the above configuration can avoid the occurrence of weld lines in the valve seat without using a special mold structure.

DESCRIPTION OF EMBODIMENTS

Figure 1:
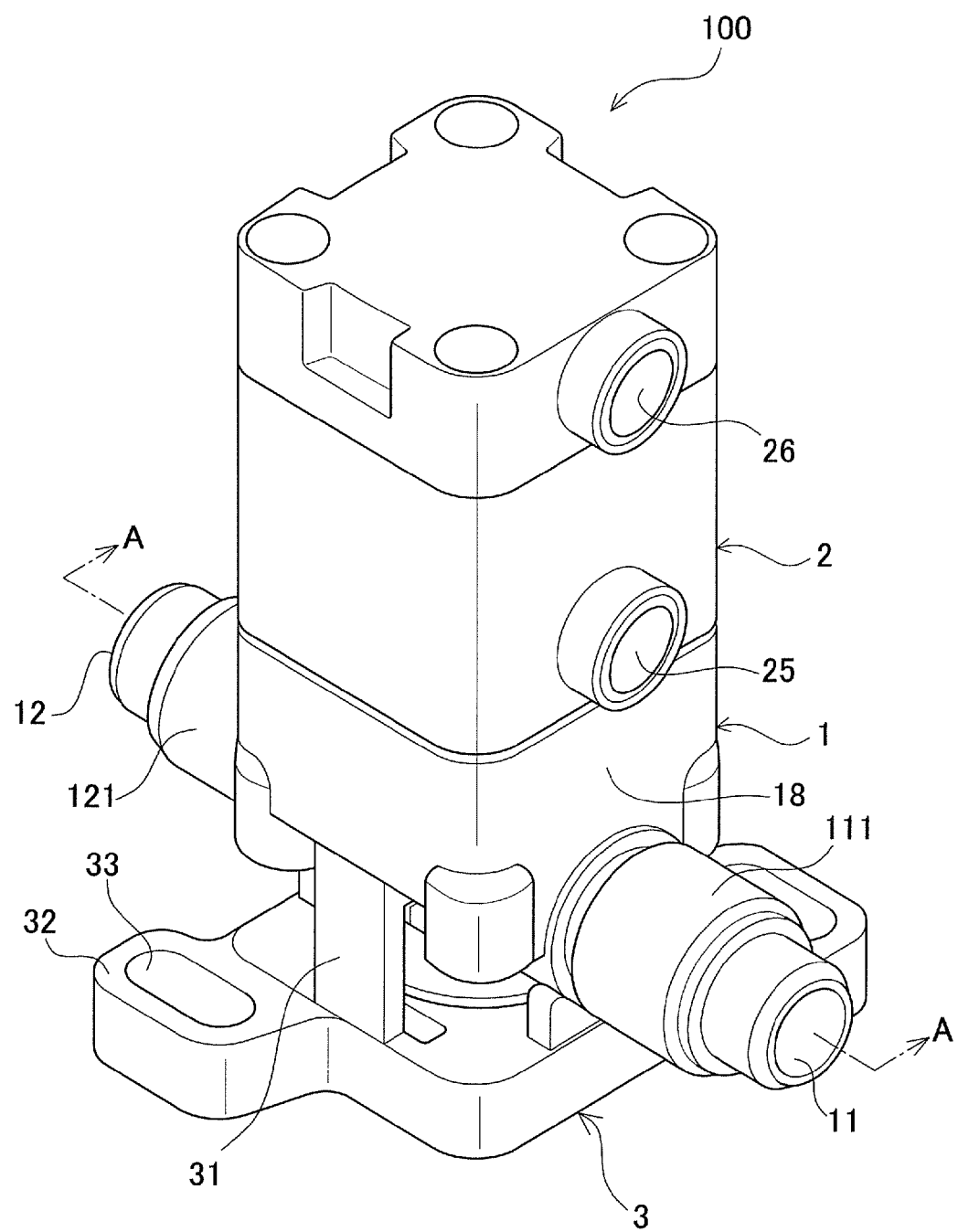
FIG. 1 is a perspective view showing an entire fluid control valve in an embodiment of the invention.
Figure 2:
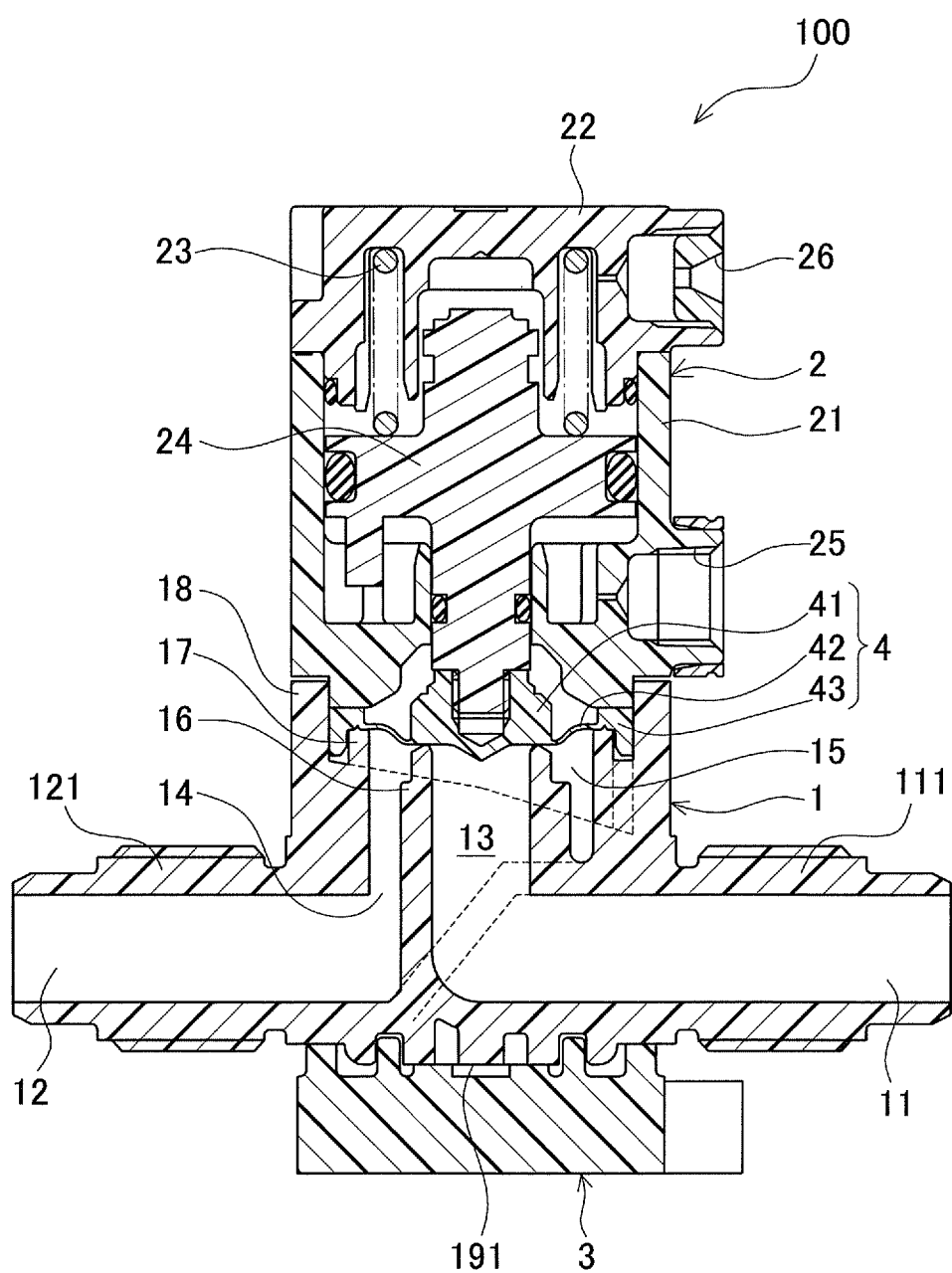
FIG. 2 is a cross sectional view of the fluid control valve shown in FIG. 1, showing a valve closed state.
Figure 3:
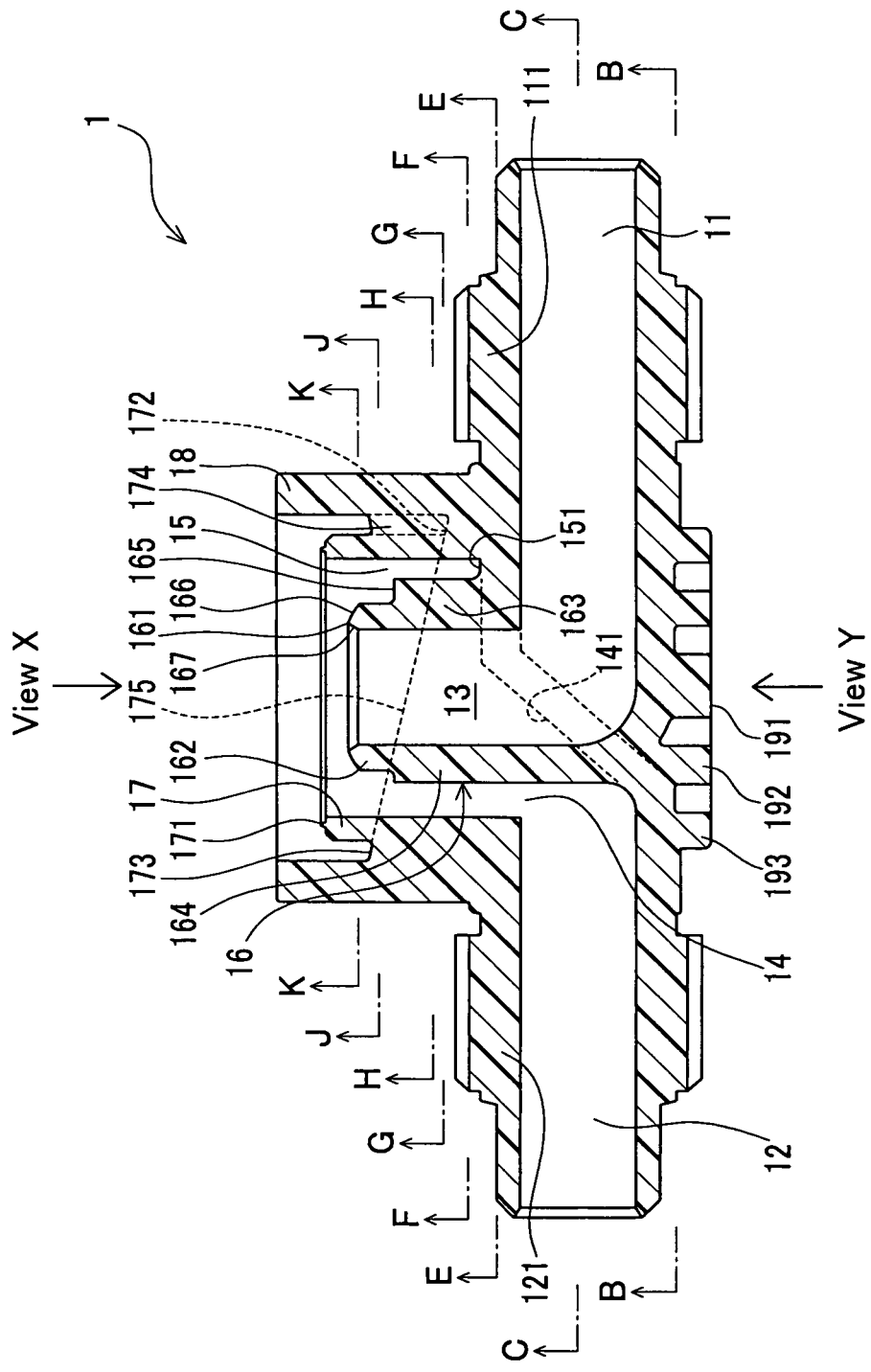
FIG. 3 is a cross sectional view of a valve main body of the fluid control valve shown in FIG. 1.
Figure 4:
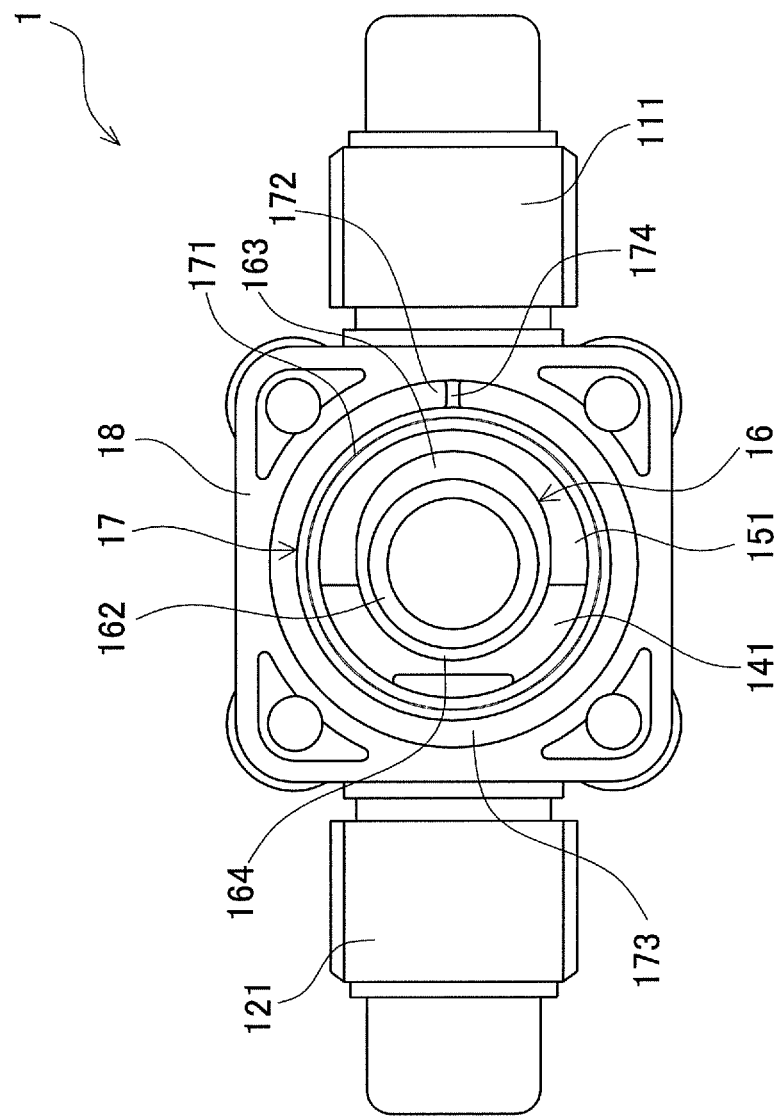
FIG. 4 is a top view (View X) of the valve main body shown in FIG. 3.
Figure 5:
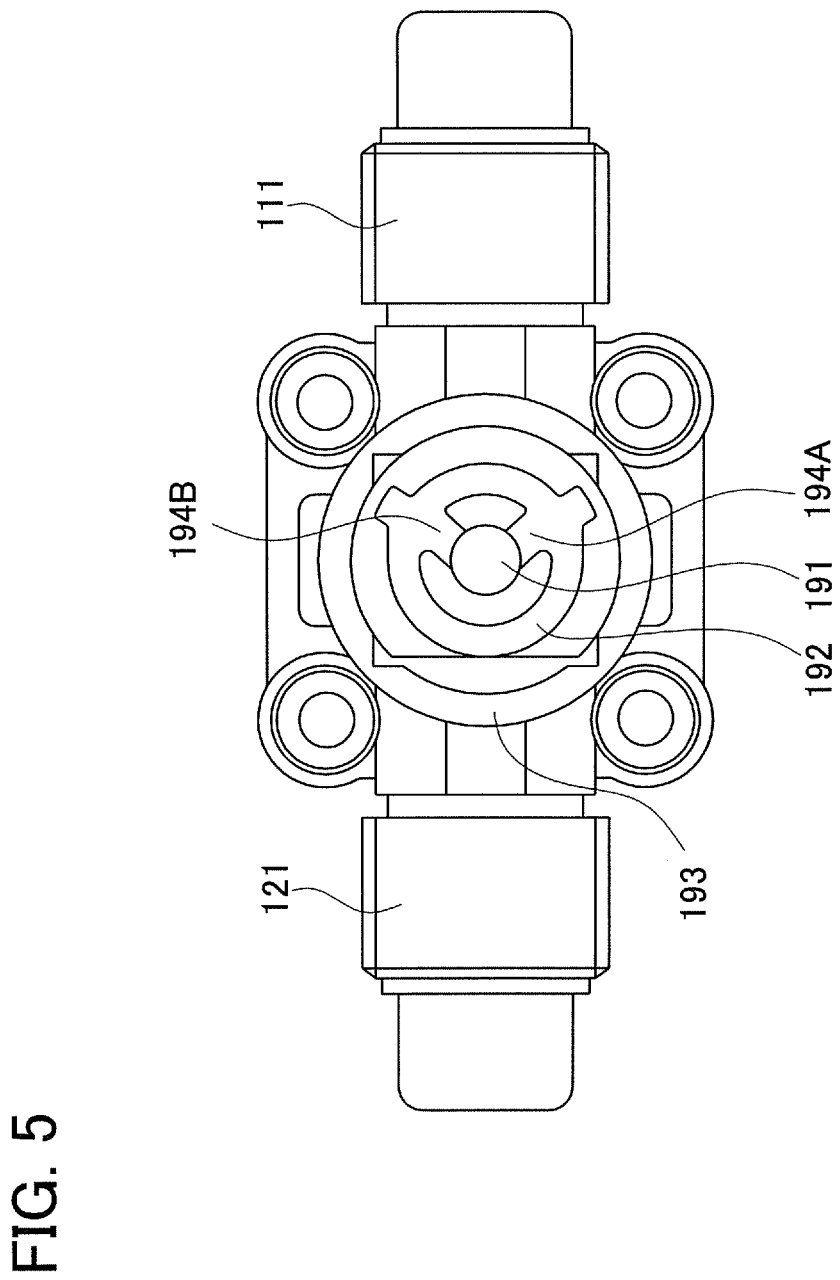
FIG. 5 is a bottom view (View Y) of the valve main body shown in FIG. 3.
Figure 6:
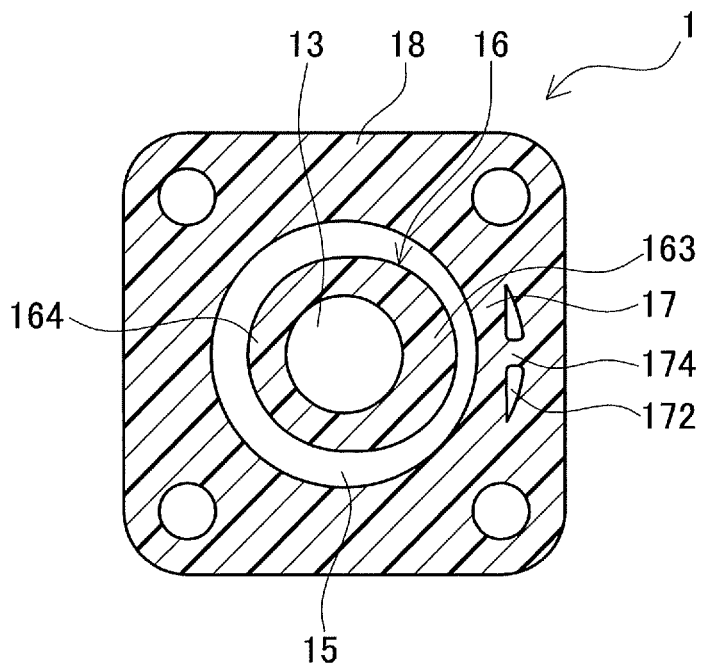
FIG. 6 is a G-G cross sectional view of the valve main body shown in FIG. 3.
Figure 7:
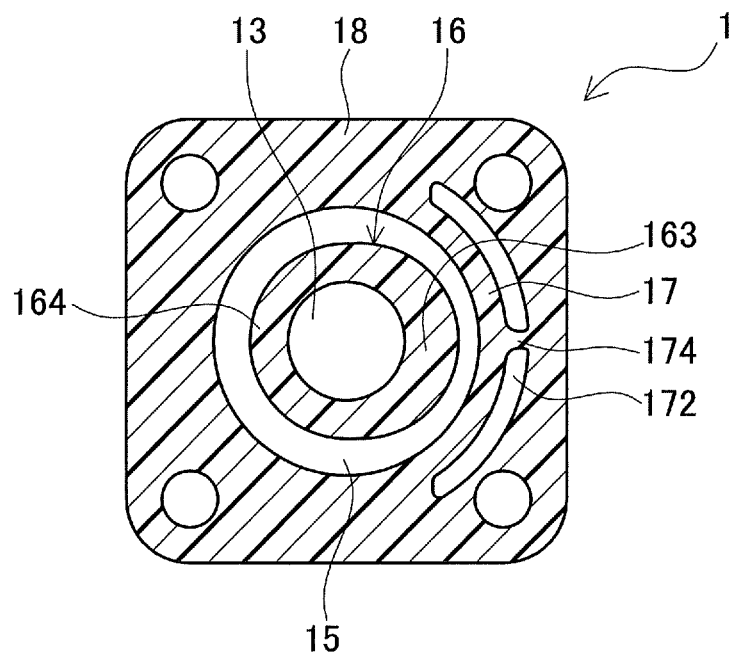
FIG. 7 is an H-H cross sectional view of the valve main body shown in FIG. 3.
Figure 8:
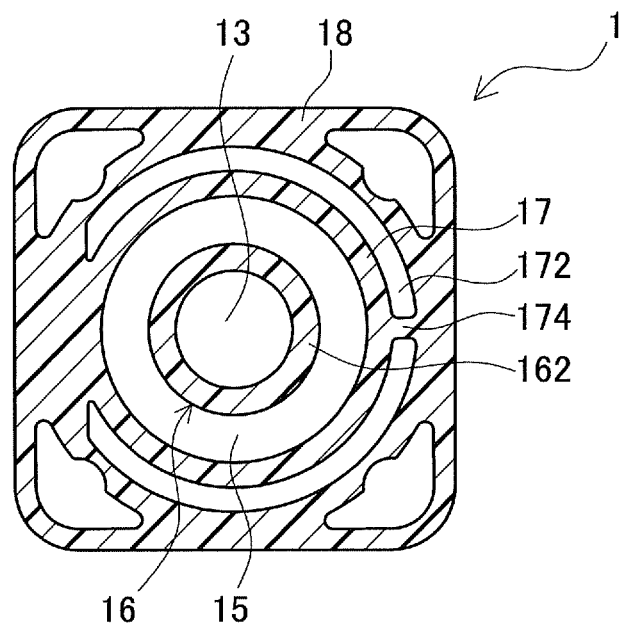
FIG. 8 is a J-J cross sectional view of the valve main body shown in FIG. 3.
Figure 9:
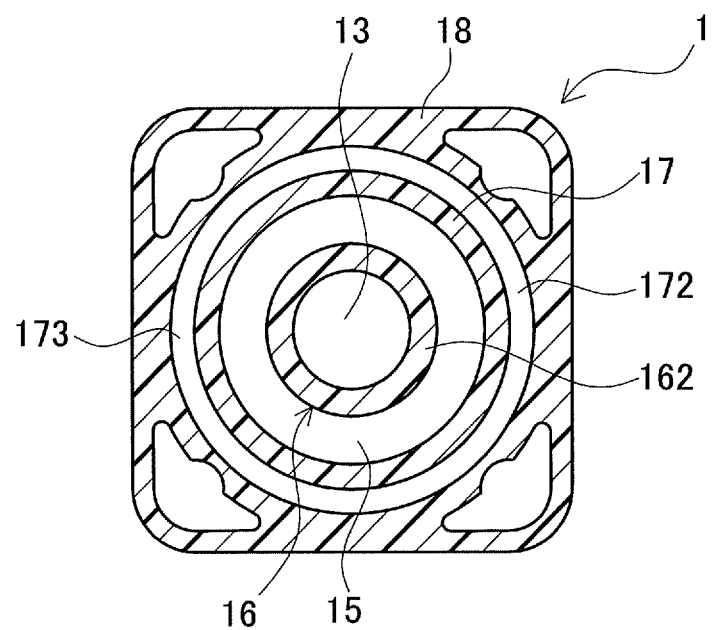
FIG. 9 is a K-K cross sectional view of the valve main body shown in FIG. 3.
Figure 10:
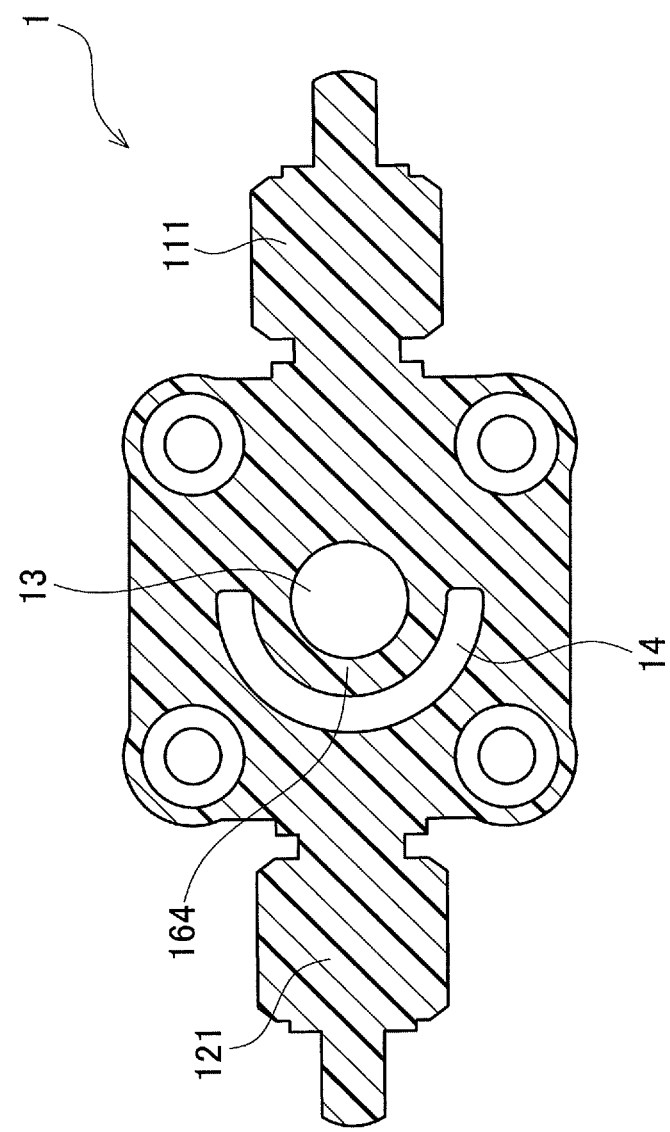
FIG. 10 is an E-E cross sectional view of the valve main body shown in FIG. 3.
Figure 11:
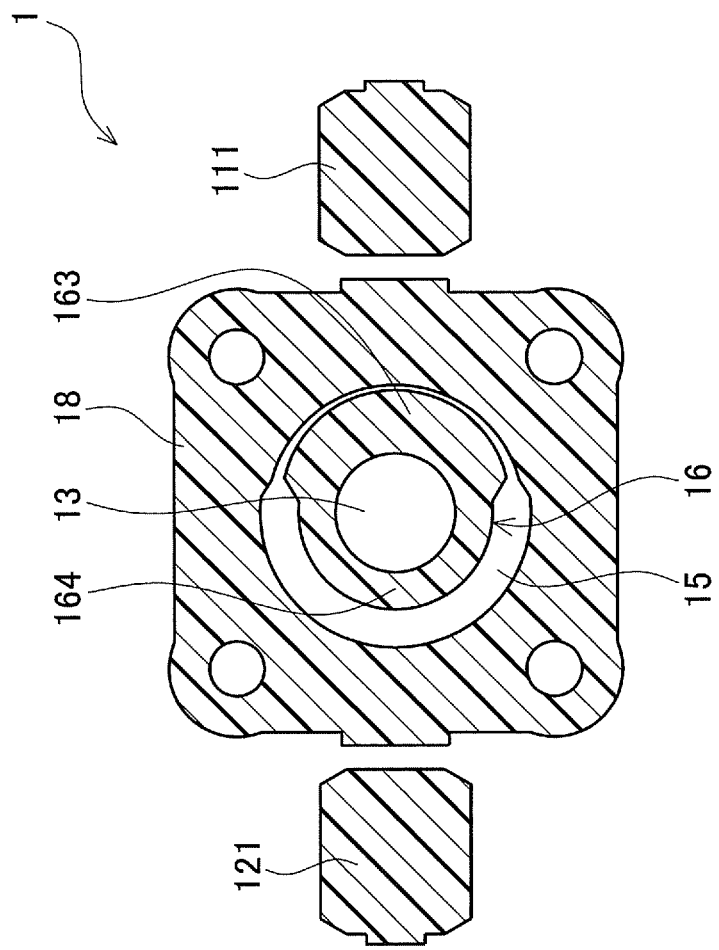
FIG. 11 is an F-F cross sectional view of the valve main body shown in FIG. 3.
Figure 12:
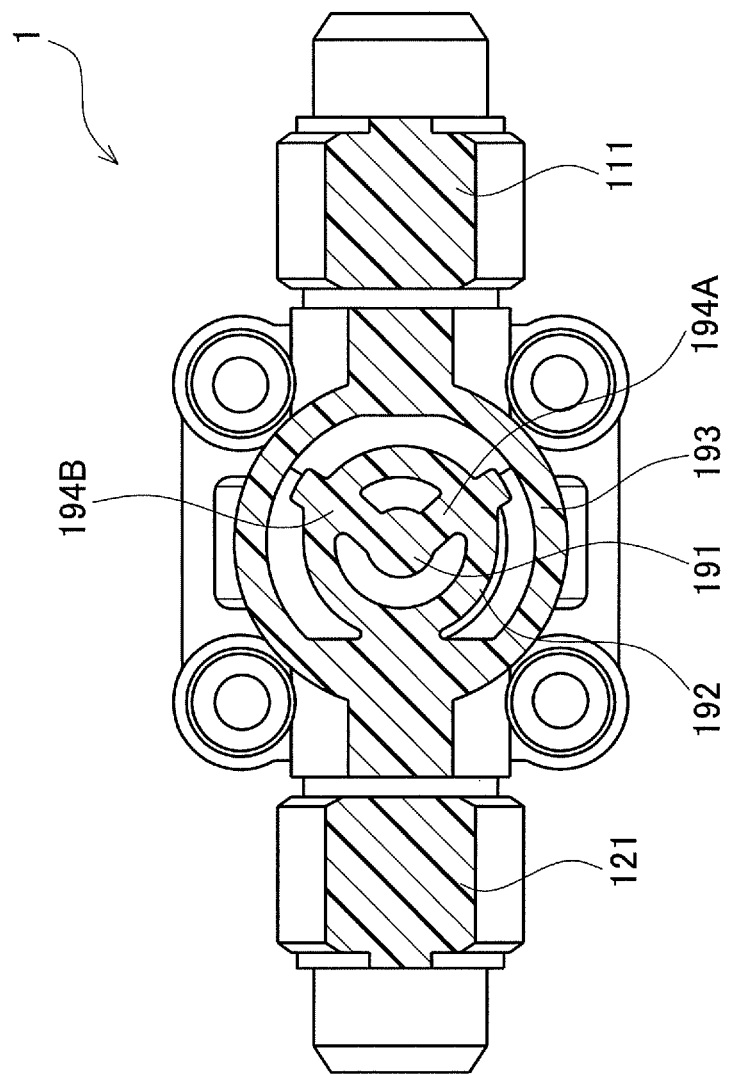
FIG. 12 is a B-B cross sectional view of the valve main body shown in FIG. 3.
Figure 13:
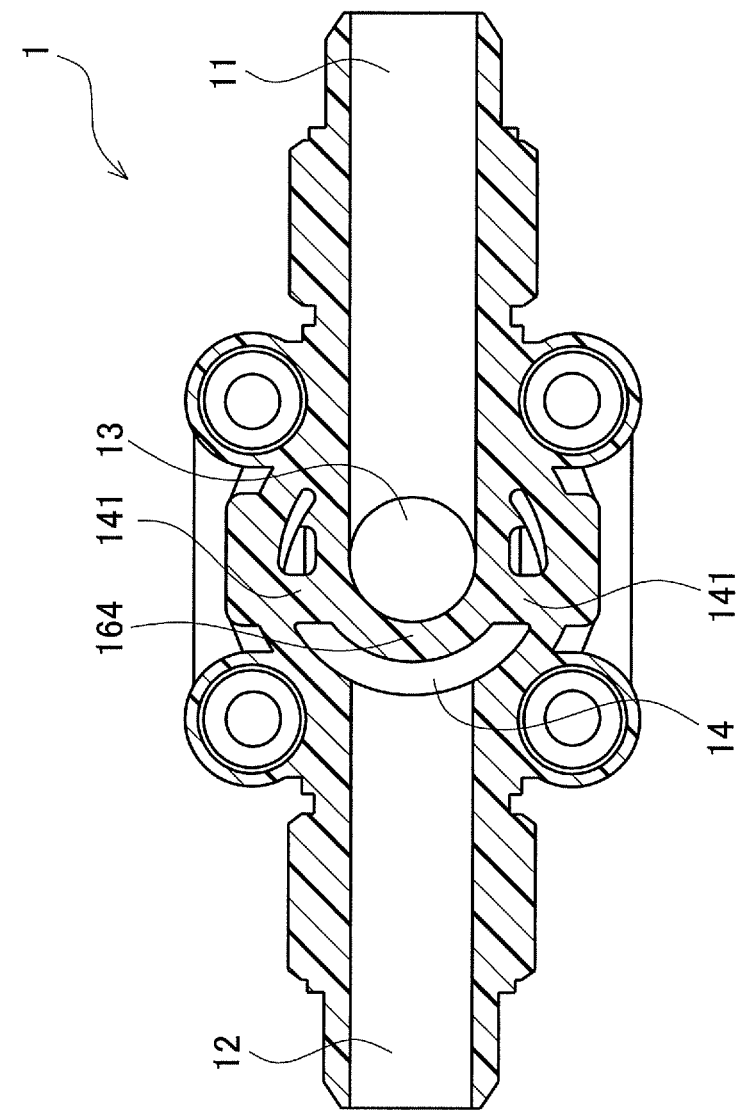
FIG. 13 is a C-C cross sectional view of the valve main body shown in FIG. 3.

A detailed description of a preferred embodiment of a fluid control valve embodying the present invention will now be given referring to the accompanying drawings. FIG. 1 is a perspective view showing an entire the fluid control valve in the present embodiment of the invention. FIG. 2 is a cross sectional view of the fluid control valve shown in FIG. 1, showing a valve closed state. FIG. 3 is a cross sectional view of a valve main body of the fluid control valve shown in FIG. 1. FIG. 4 is a top view (view X) of the valve main body shown in FIG. 3. FIG. 5 is a bottom view (view Y) of the valve main body shown in FIG. 3. FIG. 6 is a G-G cross sectional view of the valve main body shown in FIG. 3. FIG. 7 is an H-H cross sectional view of the valve main body shown in FIG. 3. FIG. 8 is a J-J cross sectional view of the valve main body shown in FIG. 3. FIG. 9 is a K-K cross sectional view of the valve main body shown in FIG. 3. FIG. 10 is an E-E cross sectional view of the valve main body shown in FIG. 3. FIG. 11 is an F-F cross sectional view of the valve main body shown in FIG. 3. FIG. 12 is a B-B cross sectional view of the valve main body shown in FIG. 3. FIG. 13 is a C-C cross sectional view of the valve main body shown in FIG. 3.

The fluid control valve of the present embodiment can be installed in a semiconductor manufacturing device and used as a chemical fluid control valve, for example. When it is used as the chemical fluid control valve, a valve main body for passing a chemical liquid is made of fluorine-based resin superior to corrosion resistance and heat resistance. The fluorine-based resin has a high melting temperature and is apt to generate weld lines at a final filling area when molten resin is injected into a cavity of a mold. In the present embodiment, therefore, the configuration of a valve is designed so that molten resin branches and flows into two or more directions but the branched flows do not merge at the final filling area, i.e., so that branched flows rapidly join together to flow uniformly. It is to be noted that the fluorine-based resin may include PFA (Tetrafluoroethylene-perfluoroalkyl vinyl ether copolymer).

Referring to FIG. 1, a fluid control valve 100 includes a valve main body 1, a valve upper body 2, and a mounting plate 3. The valve main body 1 includes a rectangular boss portion 18, a protruding portion 111 formed to horizontally protrude from one side surface of the boss portion 18 and provided with an inlet port 11, and a protruding portion 121 formed to horizontally protrude from the other opposite side surface and provided with an outlet port 12. On the upper end of the boss portion 18, the rectangular valve upper body 2 provided with an operation port 25 and an air vent 26 is placed and connected to the boss portion 18 with screws. On the lower end of the boss portion 18, the flat plate-like mounting plate 3 is connected with the boss portion 18 with locking pawls 31. The mounting plate 3 includes lugs 32 protruding diagonally in opposite directions, each lug 32 being formed with a mounting hole 33.

As shown in FIG. 2, a diaphragm valve element 4 is held between the valve main body 1 and the valve upper body 2. This diaphragm valve element 4 consists of a main portion 41, a web portion 42 extending around the main portion 41, and a retainer portion 43 formed on the outer periphery of the web portion 42. The main portion 41 is connected to a piston 24 housed in the valve upper body 2. The piston 24 is urged downward by a compression spring 23. The piston 24 is moved upward by air supplied through the operation port 25 and downward by the urging force of the compression spring 23. The main portion 41 is moved up and down together with the piston 24.

As shown FIGS. 2 and 3, the boss portion 18 of the valve main body 1 is provided with, on its inner peripheral side, an inner wall 16 and an outer wall 17 each vertically extending to form a double cylinder structure. A valve chamber 15 opening on an upper side is provided between the inner wall 16 and the outer wall 17. This valve chamber 15 is an annular space defined between the inner wall 16 and the outer wall 17.

As shown in FIGS. 3 and 4, the valve chamber 15 has a chamber bottom 151 having a semi-circular-arc shape in a position where the protruding portions 111 and 121 continuous to the inlet port 11 and outlet port 12 respectively are located to intersect with the boss portion 18.

As shown in FIGS. 3, 10, and 13, the valve chamber 15 communicates with the inlet port 11 and the outlet port 12 which are formed to horizontally extend from the opposite side surfaces of the valve main body 1 through the valve seat 161. An inflow passage 13 communicating with the valve chamber 15 via the valve seat 161 is formed like an L-shape extending vertically through the inner wall 16 from an open side and bending horizontally.

The chamber bottom 151 of the valve chamber 15 is formed, in a portion a little close to the outlet port 12 than the center, with an inclined surface 141 sloping down toward the outlet port 12. An outflow passage 14 is formed on the inclined surface 141 to extend from the outlet port 12 to the valve chamber 15. As shown in FIGS. 10 and 13, the outflow passage 14 is an arcuate groove communicating with the valve chamber 15.

Referring to FIG. 3, the inner wall 16 is formed, on the open side, with the valve seat 161. This valve seat 161 serves as a seal surface with which the valve-element main portion 41 comes into or out of contact. The valve seat 161 is formed as a narrow-ring-shaped flat surface, and an outer bevel 166 and an inner bevel 167 are formed respectively on an outer circumferential side and an inner circumferential side of the valve seat 161. Along a boundary line at which the valve seat 161 and the outer bevel 166 intersect, a division line of a mold cavity is provided. This division line serves as a gas vent.

As shown in FIGS. 2 and 3, the inner wall 16 on the inlet port side extends vertically from the chamber bottom 151. The inner wall 16 on the outlet port side extends from the inclined surface 141 sloping down toward the outlet port 12. This inner wall 16 is configured to isolate or separate a fluid flowing in the inlet port 11 and a fluid flowing in the outlet port 12. The inner wall 16 is further formed with a stepped portion 165 facing upward at a predetermined height. The inner wall 16 is shaped in a cylindrical form including a thick-wall portion 163 between the chamber bottom 151 or the inclined surface 141 and the stepped portion 165 so that a wall thickness of the inner wall 16 is thicker on the inlet port 11 side than on the outlet port 12 side.

As shown in FIGS. 3, 6, 7, and 11, the outer shape of the inner wall 16 from the chamber bottom 151 surrounding the inner wall 16 to the stepped portion 165 is designed to be oblong in cross section. In the oblong cross section, at the boss center, the inflow passage 13 is formed in a circular cross section. Of the oblong cross section formed with the circular cross section, an almost half part located on the inlet port 11 side forms the thick-wall portion 163. On the other hand, of the oblong cross section formed with the circular cross section, the other almost half part on the outlet port 12 side forms a thin-wall portion 164. The thickness of the thick-wall portion 163 is preferably set to be about 1.3 to 2 times larger than the thickness of the thin-wall portion 164.

As shown in FIGS. 3, 8, and 9, the inner wall 16 includes a uniform-thick wall portion 162 between the stepped portion 165 and the valve seat 161. This uniform-thick wall portion 162 has a cylindrical form having a thinner wall than the thin-wall portion 164 on the outlet port 12 side. Assuming that the thickness of the thin-wall portion 164 is t, the uniform-thick wall portion 162 is preferably designed with a thickness of in the order of 0.5t to 0.7t and a vertical length of in the order of 0.9t to 1.2t. When the uniform-thick wall portion 162 is formed with a thinner wall than the thin-wall portion 164, the flow of molten resin is blocked once by the stepped portion 165 continuous to the uniform-thick wall portion 162. Thus, the flow of the molten resin flowing from two directions through the cylindrical cavity and the flow of the molten resin flowing upward with uniform height are restricted once by the stepped portion 165, so that those flows join together or move with uniform height or level. Accordingly, the molten resin having passed the stepped portion 165 flows to fill the cylindrical cavity while keeping the circumferential leading end at the same height until the molten resin reaches the valve seat 161 to be formed at the upper end of the uniform-thick wall portion 162.

As shown in FIGS. 3 and 4, the outer wall 17 of the valve chamber 15 is formed with a seal portion 171 arranged in tight contact with the retainer portion 43 of the diaphragm valve element 4. The upper end of the seal portion 171 is horizontally flat and formed with a triangular protrusion protruding upward at the center in a width direction. The seal portion 171 has a cylindrical outer shape. Around the outer circumference of the seal portion 171, there are provided almost annular inclined grooves (also referred to as "annular grooves") 172 and 173 to be deep on the inlet port 11 side and shallow on the outlet port 12 side to provide a sloping bottom surface 175. In the inclined groove 172 on the inlet port 11 side, having a deep depth, a reinforcing rib 174 is formed to connect the outer wall 17 to the boss portion 18 for reinforcement of the outer wall 17. The depth of the inclined groove 172 on the inlet port 11 side is preferably set to be about three to five times larger than the depth of the inclined groove 173 on the outlet port 12 side. With the sloping bottom 175 of the annular grooves 172 and 173, the molten resin is allowed to smoothly flow from the inlet port side 11 in the cavity to the outlet port side 12. Since the molten resin is easily moved between the inlet port 11 side and the outlet port 12 side of the outer wall 17, the molten resin can be supplied in balance into the cavity for the outer wall 17.

Consequently, when the molten resin is to be filled into the upper end of the cavity to form the seal portion 171, the molten resin can be filled with the leading end with uniform height in the entire circumference.

As shown in FIGS. 3, 5, and 12, the lower end of the boss portion 18 of the valve main body 1 is formed, at the center, with a resin injected part 191 protruding downward. Around the outer circumference of the resin injected part 191, a first annular rib 192 and a second annular rib 193 are formed each protruding downward and radially spaced from each other. Furthermore, resin supply ribs 194A and 194B are formed radially extending from the resin injected part 191 toward the inlet port 11 side (the thick-wall portion 163 of the inner wall 16). The resin supply ribs 194A and 194B serve to prompt the flow of molten resin toward the inlet port 11 side (the thick-wall portion 163 of the inner wall 16). Lower ends of the resin injected part 191, the first annular rib 192, and the second annular rib 193 are placed in contact with the mounting plate 3.

<Results of Resin Flowing Analysis on Valve Main Body>

The following explanation is given to the results of resin flowing analysis on the valve main body 1 of the fluid control valve 100 of the present embodiment. FIGS. 14 to 19 are perspective views showing the resin flowing analysis results. FIGS. 14 to 19 illustrate perspective schematic view of a resin filling condition seen from obliquely above showing a process in time series from the start of injection of molten resin into a mold cavity to produce the valve main body 1 to the completion of full filling the molten resin. Virtual lines in each figure represent a contour shape line of the valve main body 1 to be produced (the internal shape of the cavity) and arrows indicate flowing directions of injected resin in the cavity. Dot patterns in each figure represent the time series by six gray scales, in which a black portion indicates an initial stage of injection of molten resin and a white portion indicates a completion stage of filling of molten resin. In the following explanation, portions of the cavity are given the same reference signs corresponding to the portions of the valve main body shown in FIGS. 1 to 13, but those reference signs are omitted in FIGS. 14 to 19 for convenience.

Figure 14:
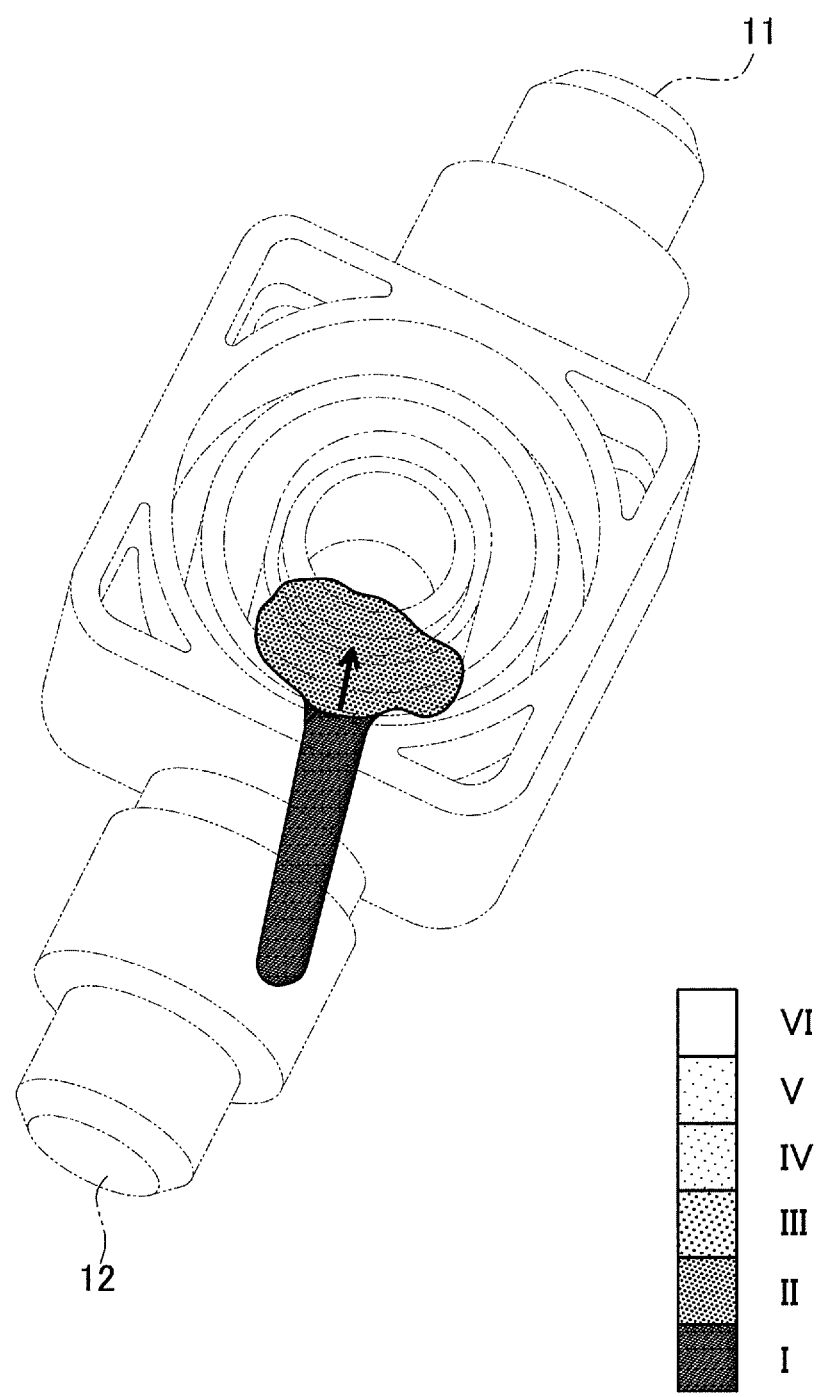
FIG. 14 is a perspective view showing resin flowing analysis result.

As shown in FIG. 14, molten resin is injected into the mold cavity from the resin injected part 191 to be formed at the center of a lower surface of the valve main body 1.

Figure 15:
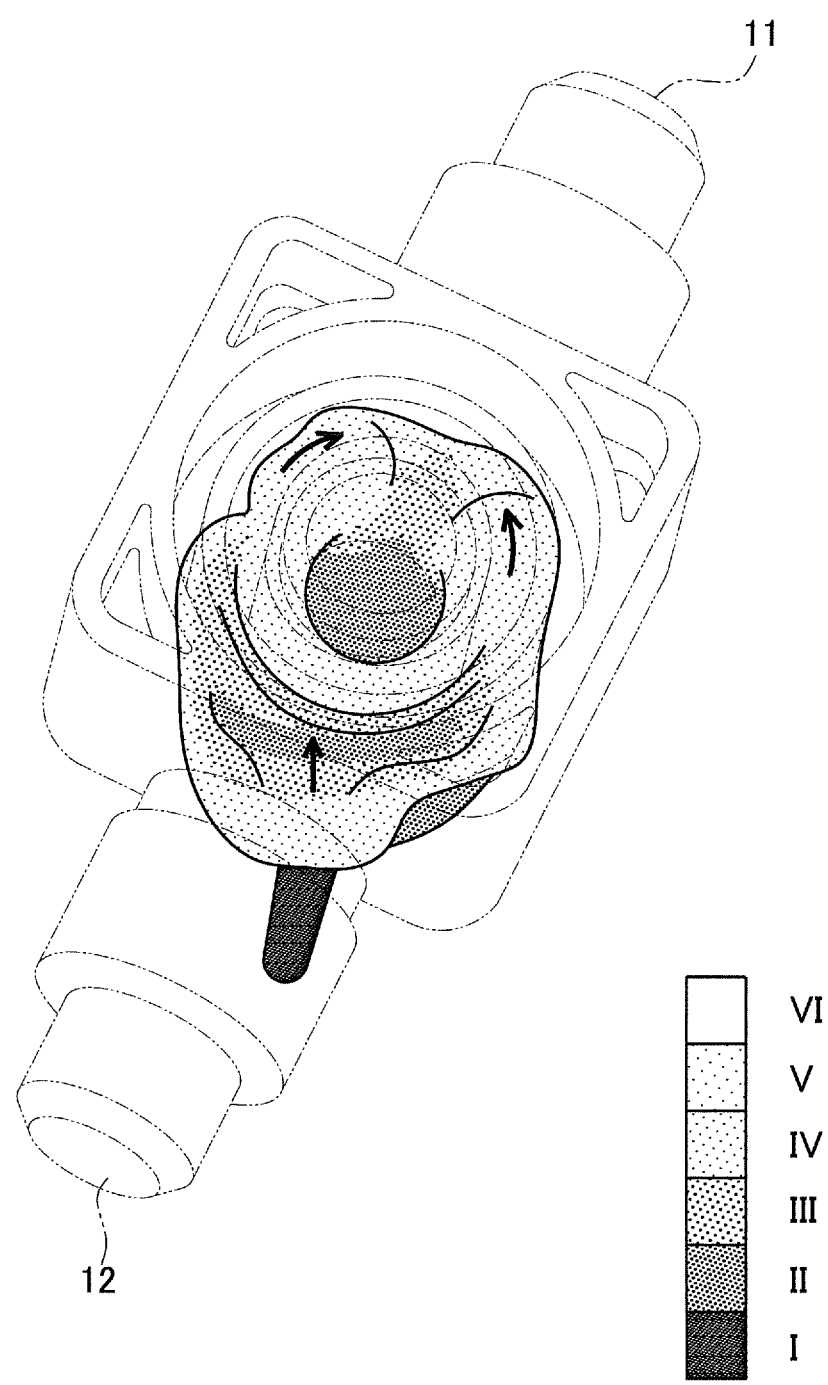
FIG. 15 is another perspective view showing resin flowing analysis result.

As shown in FIG. 15, the injected molten resin in the cavity spreads over the bottom of the valve main body 1 and first flows in a portion which will form the outlet port 12 side of the inner wall 16 vertically extending from the bottom of the valve main body 1 earlier than in other portions. The resin flows into the inlet port 11 side of the inner wall 16 by going around the inflow passage 13 and thus the filling timing is delayed.

However, since the thick-wall portion 163 vertically extending from the chamber bottom 151 is to be formed in the inner wall 16 on the inlet port 11 side, a filling speed on the inlet port 11 side becomes faster than a filling speed on the outlet port 12 side as soon as the resin begins to flow in the thick-wall portion 163.

Figure 16:
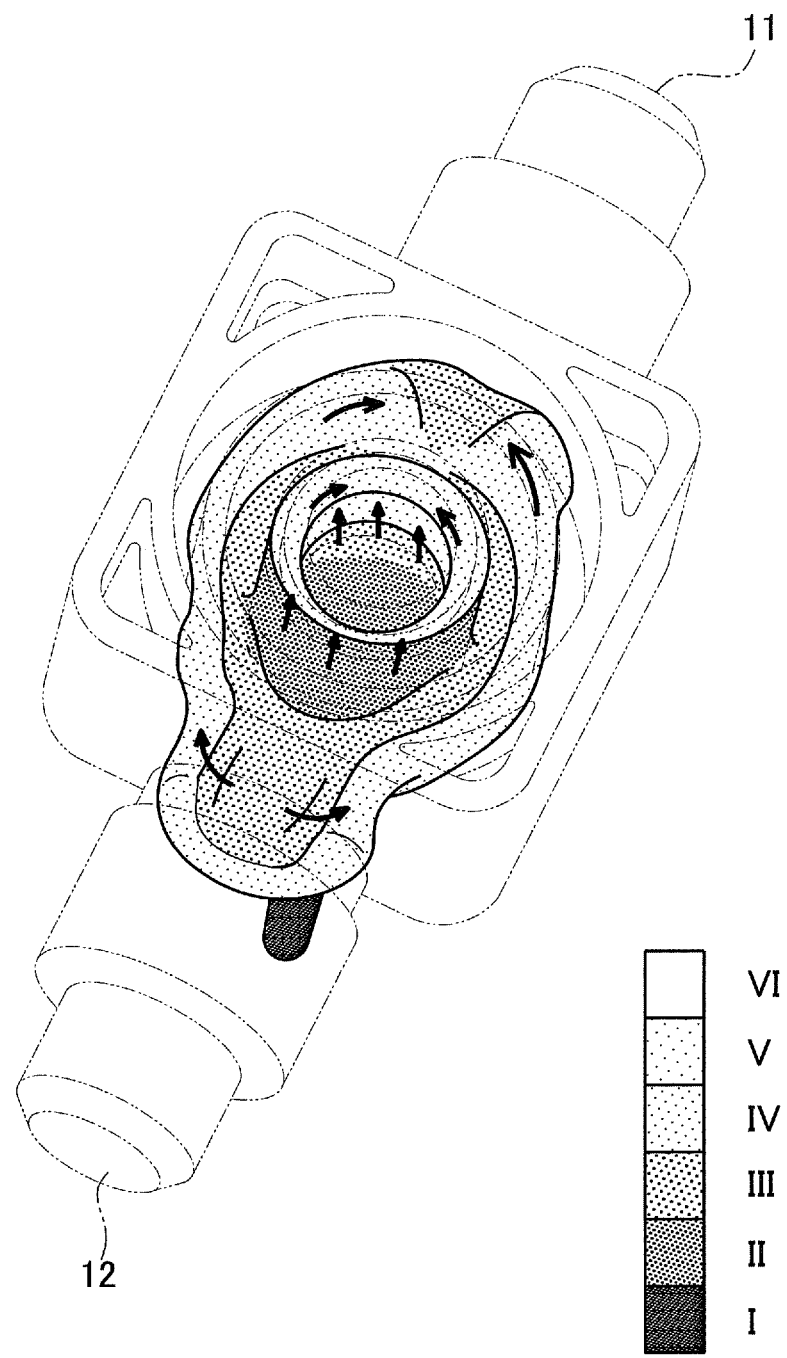
FIG. 16 is another perspective view showing resin flowing analysis result.

As shown in FIG. 16, after the start of supplying the molten resin in the thick-wall portion 163 of the inner wall 16, the molten resin flowing in the cavity for the inner wall 16 is filled substantially uniform over an entire circumference. At that time, in the cavity for the outer wall 17, the molten resin is supplied more on the inlet port 11 side and thus the molten resin on the outlet port 12 side is short.

Figure 17:
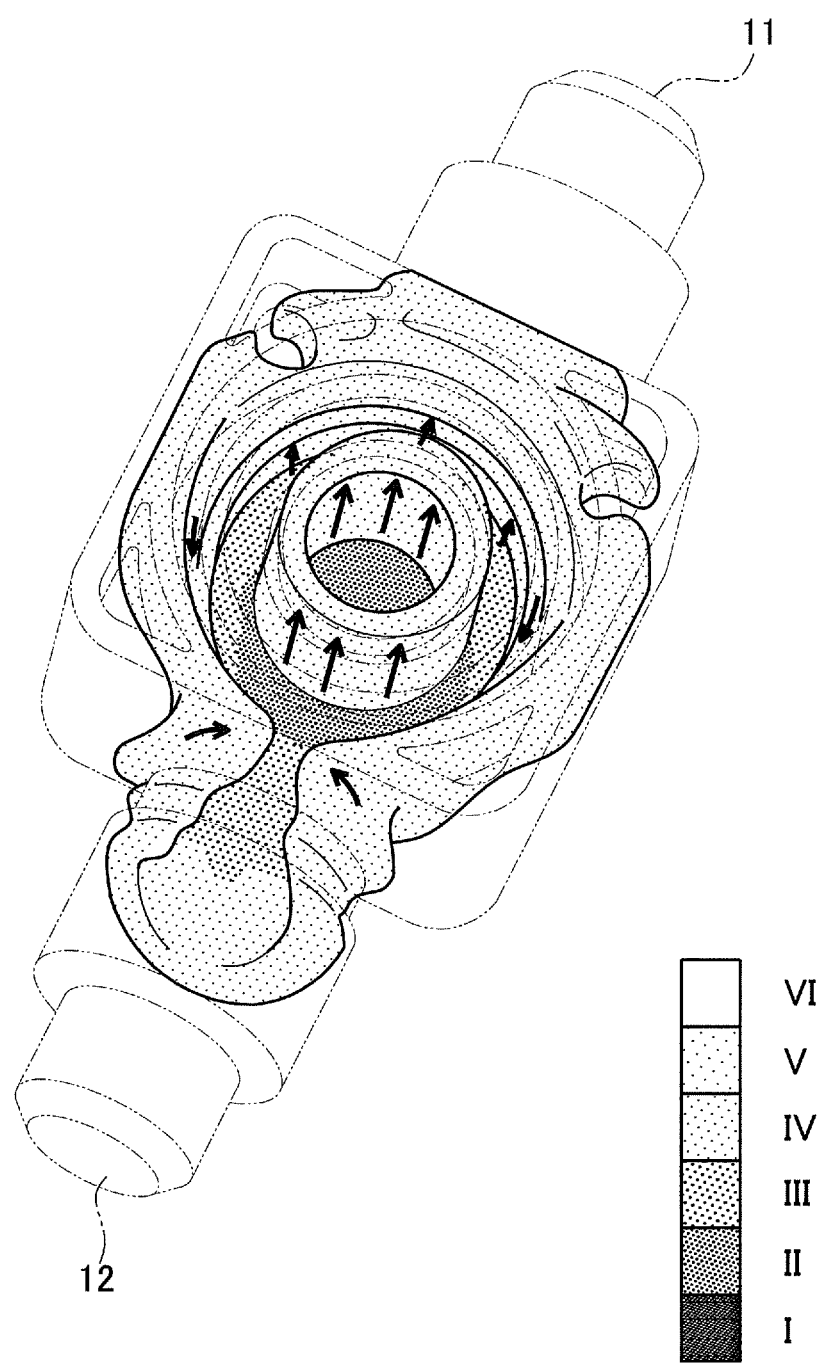
FIG. 17 is another perspective view showing resin flowing analysis result.

Subsequently, as filling of the molten resin further progresses as shown in FIG. 17, the molten resin flows in the cavity for the uniform-thick wall portion 162 to be formed between the thick-wall portion 163 and the valve seat 161 of the inner wall 16. In this uniform-thick wall portion 162, the leading end of the molten resin flows with the same height over the entire circumference.

On the other hand, in the cavity for the outer wall 17, the molten resin first flows in the inlet port 11 side. On the inlet port 11 side, the inclined grooves 172 and 173 have started to be formed. It is found that the molten resin is moving along the bottoms of the inclined grooves 172 and 173 from the inlet port 11 side to the outlet port 12 side.

On the outlet port 12 side, the resin goes around the outflow passage 14 and is about to merge in or near the outer periphery of the boss portion 18.

Figure 18:
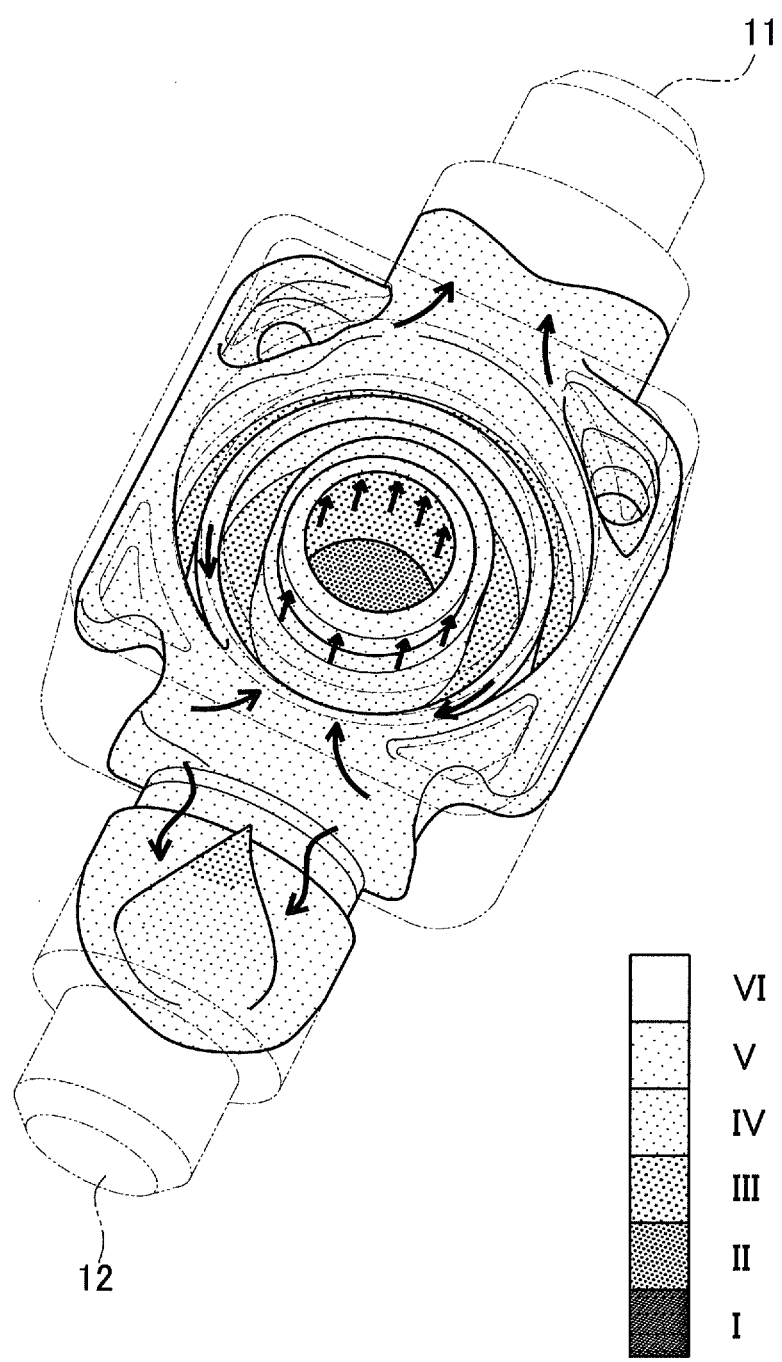
FIG. 18 is another perspective view showing resin flowing analysis result.

As filling of the resin further progresses, as shown in FIG. 18, the molten resin is uniformly filled in the cavity for the inner wall 16 up to the valve seat 161 at the leading end. At that time, the molten resin does not merge in the inner wall 16, so that no weld lines occur in the valve seat 161 which is the seal surface.

Furthermore, the molten resin is filled in the boss portion 18 on the inlet port 11 side and successively flows toward the protruding portion 111 of the inlet port 11.

On the other hand, in the cavity for the outer wall 17, the resin is filled almost simultaneously on the inlet port 11 side and the outlet port 12 side. Accordingly, the molten resin is considerably filled on the outlet port 12 side via the annular inclined groove 173 formed around the outer circumference of the seal portion 171. On the outlet port 12 side, further, the resin flows flowing in the outer periphery of the boss portion 18 merge therein and then move in an outer wall direction and toward the leading end of the protruding portion 121 of the outlet port 12.

Figure 19:
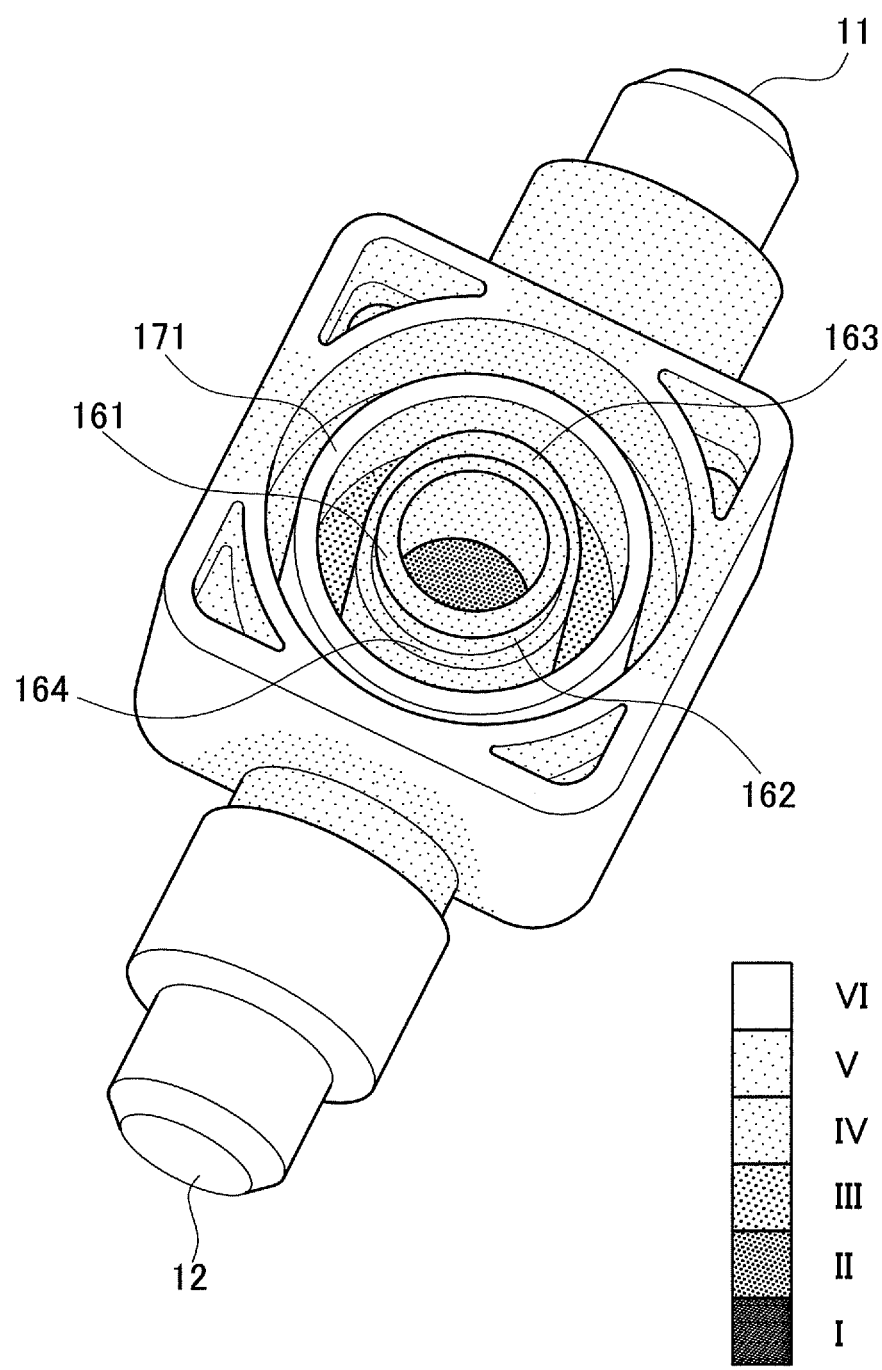
FIG. 19 is another perspective view showing resin flowing analysis result.

As shown in FIG. 19, as the filling of resin progresses, in the cavity for the seal portion 171 of the outer wall 17, the resin is filled over the entire circumference at the same time. At that time, in the cavity forming the outer wall 17, the molten resin flows do not merge and thus no weld lines occur in the seal portion 171.

Accordingly, in the valve main body 1 of the present embodiment, no weld lines occur in both of the valve seat 161 and the seal portion 171 respectively formed in the inner wall 16 and the outer wall 17 constituting a double cylinder structure.

In the cavity corresponding to the leading end of the protruding portion of the inlet port and a leading end of the protruding portion of the outlet port, the molten resin is simultaneously filled. Therefore, any weld lines are not generated in both the inlet port 11 and the outlet port 12.

<Operations and Effects>

According to the fluid control valve of the present embodiment, as explained in detail above, the following operations and effects can be provided.

Specifically, according to the fluid control valve 100 of the present embodiment, there are provided the resin valve main body 1 including the valve chamber 15 communicating with the inlet port 11 and the outlet port 12 formed respectively in two opposite side surfaces of the main body 1 and opening at the center of the upper surface of the main body 1 and the valve seat 161 provided in the inner wall 16 of the valve chamber 15. The fluid control valve is further provided with the valve element 4 arranged to be moved into or out of contact with the valve seat 161 and the valve upper body 2 including the drive section to drive the valve element 4. The inflow passage 13 is formed like an almost L shape extending through the inner wall 16 to communicate between the inlet port 11 and the valve chamber 15 via the valve seat 161. The inner wall 16 is shaped in a cylindrical form including the thick-wall portion 163 so that a wall thickness of the inner wall 16 is thicker on the inlet port 11 side than on the outlet port 12 side. The resin injected part 191 is provided at the center of a lower surface of the valve main body 1. Accordingly, the configuration of the valve main body 1 designed as above can prevent the generation of weld lines in the valve seat 161 without using a special mold structure.

To be concrete, the inflow passage 13 is formed like an almost L shape extending through the inner wall 16 from the inlet port 11 to the valve chamber 15 via the valve seat 161. Accordingly, when the molten resin flows in the cavity to inject mold the valve main body 1, the inflow passage 13 interferes with a resin flow from the resin injected part 191 toward the inner wall 16 on the inlet port 11 side. The resin flow is thus made slower than the resin flowing toward the outlet port 12 side of the inner wall 16 which is not interfered by the inflow passage 13.

However, the inner wall 16 provided with the valve seat 161 is formed in the cylindrical shape including the thick-wall portion 163, having a wall thickness thicker on the inlet port 11 side than on the outlet port 12 side. In injection molding, the molten resin flowing in the thick-wall portion 163 is less likely to be influenced by viscosity resistance increased due to a temperature decrease. In the area of the cavity to mold the inner wall 16, the resin flows relatively faster on the inlet port 11 side than on the outlet port 12 side.

When the molten resin flowing on the inlet port 11 side is passing through the thick-wall portion 163, accordingly, this resin catches up on the molten resin flowing on the outlet port 12 side and merges therewith in the cylindrical cavity for the inner wall 16, and then the merged flow reaches the valve seat 161 which is the seal surface. Accordingly, after the molten resin passes through the thick-wall portion 163, the molten resin on the inlet port 11 side and the molten resin on the outlet port 12 side join together and simultaneously fill the cylindrical cavity for the inner wall 16.

As a result, when the molten resin flowing on the inlet port 11 side and the molten resin flowing on the outlet port 12 side merge with each other in the cylindrical cavity for the inner wall 16, even if weld lines occur in the merging area, the weld lines can be eliminated by further molten resin subsequently supplied together in the cylindrical cavity for the inner wall 16.

According to the present embodiment, the configuration of the valve main body 1 designed as above can prevent the generation of weld lines in the valve seat 161 without using a special mold structure.

According to the fluid control valve 100 of the present embodiment, the annular seal portion 171 is formed at the upper end of the outer wall 17 of the valve chamber 15 to hold the retainer portion 43 of the valve element 4 between the upper end of the outer wall 17 and the lower end of the valve upper body 2. The annular groove (the annular inclined grooves 172 and 173) is formed around the outer circumference of the seal portion 171 so that the groove is deep on the inlet port 11 and shallow on the outlet port 12 side. Thus, no weld lines occur even in the seal portion 171 for sealing the retainer portion 43 of the valve element 4.

To be concrete, as the molten resin is supplied into the thick-wall portion 163 on the inlet port 11 side, the molten resin is also supplied into the cavity for the outer wall 17 on the inlet port 11 side via a rib on the chamber bottom 151 side.

On the other hand, in the cavity for the outer wall 17 on the outlet port 12 side, the outflow passage 14 for communicating between the outlet port 12 and the valve chamber 15 interferes with the resin flow. Thus, the flow of molten resin is made slow.

However, the annular groove (the annular inclined grooves 172 and 173) is formed around the outer circumference of the seal portion 171 formed in the outer wall 17 so that the annular groove is deep on the inlet port 11 side and shallow on the outlet port 12 side. Thus, in the cavity for the outer wall 17, the molten resin moves from the inlet port 11 side to the outlet port 12 side where the groove is shallow. Therefore, the supply timing of the molten resin into the cavity for the outer wall 17 is balanced between on the inlet port 11 side and on the outlet port 12 side.

As a result, when the molten resin is to be filled in the upper end of the cylindrical cavity for the outer wall 17 to form the seal portion 171, the molten resin is filled over the entire circumference at the same timing.

Since a merging area of molten resin is not generated in the seal portion 171 formed in the outer wall 17 defining the valve chamber 15, as above, no weld lines occur therein.

According to the present embodiment, therefore, no weld lines are generated in both of the valve seat 161 and the seal portion 171 respectively formed in the inner wall 16 and the outer wall 17 which constitute a double cylinder structure.

According to the fluid control valve 100 of the present embodiment, the outer wall 17 is configured such that a wall thickness of the seal portion on the outlet port 12 side is thicker than that of the seal portion on the inlet port 11 side. Thus, in the cylindrical cavity for the outer wall 17, the resin flow on the outlet port 12 side is relatively faster than the resin flow on the inlet port 11 side.

In the cylindrical cavity for the outer wall 17, accordingly, the molten resin flowing on the outlet port 12 side catches up on the molten resin flowing on the inlet port 11 side and merges therewith in the cavity, and the merged resin reaches the seal surface (the upper end of the seal portion 171).

According to the present embodiment, therefore, the generation of weld lines in the seal portion 171 can be further prevented.

More preferably, the outer periphery of the outer wall 17 is formed in an elliptic shape. Such an elliptic shape formed around the outer circumference of the seal portion 171 facilitates movement of the molten resin in a circumferential direction in the cylindrical cavity for the outer wall 17. This makes it easy to merge the molten resin flowing on the outlet port 12 side with the molten resin flowing on the inlet port 11 side at an early stage. The merged resin flow can therefore more easily reach the seal surface (the upper end of the seal portion 171).

According to the fluid control valve 100 of the present embodiment, furthermore, the inner wall 16 includes the uniform-thick wall portion 162 between the thick-wall portion 163 and the valve seat 161. The molten resin passes through the thick-wall portion 163 and then is filled in the cylindrical cavity for the inner wall 16 including the uniform-thick wall portion 162. When the molten resin is passing through the thick-wall portion 163, the leading end of the molten resin is held back once by the stepped shape (the stepped portion 165) between the thick-wall portion 163 and the uniform-thick wall portion 162. While the leading end of the flowing molten resin is held back once, the molten resin is caused to fill the entire circumference of the base end of the uniform-thick wall portion 162. Therefore the molten resin flowing in the uniform-thick wall portion 162 is made to flow at a uniform velocity over the entire circumference in the cylindrical cavity for the inner wall 16 so that the resin is filled uniformly over the entire circumference of the cavity. The molten resin is filled in the cylindrical cavity for the inner wall 16 while keeping the leading end of the molten resin at the same height over the entire circumference until the resin flow reaches the valve seat 161 to be formed at the upper end of the uniform-thick wall portion 162. Since the molten resin is filled with its leading end kept at the same level, the merged area is not generated in the leading end of the molten resin. Accordingly, no weld lines are generated in the valve seat 161 which is the seal surface.

According to the present embodiment, it is possible to reliably avoid the generation of weld lines in the seal surface such as the valve seat.

According to the fluid control valve 100 of the present embodiment, furthermore, the lower surface of the valve main body 1 is formed with the resin supply ribs 194A and 194B radially extending from the resin injected part 191 toward the thick-wall portion 163. In injection molding, more molten resin is supplied to the thick-wall portion 163 formed on the inlet port 11 side via the resin supply ribs 194A and 194B radially extending from the resin injected part 191. Specifically, more molten resin is supplied to the inner wall 16 (the thick-wall portion 163) on the inlet port 11 side in which molten resin flows in a curve by going around the inflow passage 13 than to the inner wall (the thin-wall portion 164) on the outlet port 12 side in which molten resin flows directly from the resin injected part 191. This can more early merge the flows of molten resin with each other while keeping them in balance. Since the flows of molten resin flowing on the inlet port 11 side and on the outlet port 12 side can be merged at an early stage in the cavity for the inner wall 16 and outer wall 17 and then the merged flow can reach the valve seat 161 and the seal portion 171, no weld lines occur in the valve seat 161 and others.

According to the present embodiment, the generation of weld lines in the valve seat 161 and others can be prevented more reliably.

According to the fluid control valve 100 of the present embodiment, there are provided the resin valve main body 1 including the valve chamber 15 communicating with the inlet port 11 and the outlet port 12 formed respectively in two opposite side surfaces of the main body 1 and opening at the center of the upper surface of the main body 1 and the valve seat 161 provided in the inner wall 16 of the valve chamber 15. The fluid control valve is further provided with the valve element 4 arranged to be moved into or out of contact with the valve seat 161 and the valve upper body 2 including the drive section to drive the valve element 4. The inflow passage 13 is formed like an almost L shape extending through the inner wall 16 to communicate between the inlet port 11 and the valve chamber 15 via the valve seat 161. The annular seal portion 171 is formed at the upper end of the outer wall 17 of the valve chamber 15 to hold the retainer portion 43 of the valve element 4 in cooperation with the lower end of the valve upper body 2. The annular groove (the annular inclined grooves 172 and 173) is formed around the seal portion 171 so as to be deep on the inlet port 11 and shallow on the outlet port 12 side. The center of the lower surface of the valve main body 1 is provided with the resin injected part 191. Accordingly, the configuration of the valve main body 1 designed as above can prevent the generation of weld lines in the seal surface such as the valve seat 161 without using a special mold structure.

To be specific, in the cavity for the outer wall 17 on the outlet port 12 side, the outflow passage 14 providing communication between the outlet port 12 and the valve chamber 15 interferes with the resin flow supplied from the resin injected part 191. Thus, the flow of molten resin flowing into the cavity for the outer wall 17 on the outlet port 12 side is relatively delayed as compared with the molten resin flowing into the cavity for the outer wall 17 on the inlet port 11 side.

However, since the annular seal portion 171 is formed at the upper end of the outer wall 17 of the valve chamber 15 to hold the retainer portion 43 of the valve element 4 in cooperation with the lower end of the valve upper body 2 and the annular groove (the annular inclined grooves 172 and 173) is formed around the outer circumference of the seal portion 171 to be deep on the inlet port 11 side and shallow on the outlet port 12. Thus, the molten resin in the cavity for the outer wall 17 on the inlet port 11 side having a deep groove in which molten resin has a high flow resistance is made to easily move to the cavity for the outer wall 17 on the outlet port 12 side having a shallow groove in which molten resin has a low flow resistance. Therefore, the supply timing of the molten resin into the cylindrical cavity for the outer wall 17 is balanced between on the inlet port 11 side and on the outlet port 12 side.

As a result, when the molten resin is to be filled in the upper end of the cylindrical cavity for the outer wall 17 to form the seal portion 171, the molten resin is filled over the entire circumference at the same timing. Thus, any merged area of the molten resin is not generated.

Since the molten resin is filled in the seal portion 171 to be formed in the outer wall 17 of the valve chamber 15 at the same timing over the entire circumference and the molten resin does not generate any merged area, no weld lines occur.

According to the fluid control valve 100 of the present embodiment, therefore, no weld lines occur in the seal portion 171 formed in the outer wall 17.

According to the fluid control valve 100 of the present embodiment, there are provided the resin valve main body 1 including the valve chamber 15 communicating with the inlet port 11 and the outlet port 12 formed respectively in two opposite side surfaces of the main body 1 and opening at the center of the upper surface of the main body 1 and the valve seat 161 provided in the inner wall 16 of the valve chamber 15. The fluid control valve is further provided with the valve element 4 arranged to be moved into or out of contact with the valve seat 161 and the valve upper body 2 including the drive section to drive the valve element 4. The inflow passage 13 is formed like an almost L shape extending through the inner wall 16 to communicate between the inlet port 11 and the valve chamber 15 via the valve seat 161. The annular seal portion 171 is formed at the upper end of the outer wall 17 of the valve chamber 15 to hold the retainer portion 43 of the valve element 4 in cooperation with the lower end of the valve upper body 2. In the outer wall 17, the seal portion 171 has a wall thickness thicker on the outlet port 12 side than on the inlet port 11 side. The resin injected part 191 is provided at the center of the lower surface of the valve main body 1. Accordingly, the valve main body 1 configured as above can avoid the generation of weld lines in the seal surface such as the seal portion 171 without using a special mold structure.

To be specific, in the cavity for the outer wall 17 on the outlet port 12 side, the outflow passage 14 communicating between the outlet port 12 and the valve chamber 15 interferes with the resin flow supplied from the resin injected part 191. Thus, the flow of molten resin flowing into the cavity for the outer wall 17 on the outlet port 12 side is relatively delayed as compared with the molten resin flowing into the cavity for the outer wall 17 on the inlet port 11 side.

The annular seal portion 171 is formed at the upper end of the outer wall 17 of the valve chamber 15 to hold the retainer portion 43 of the valve element 4 in cooperation with the lower end of the valve upper body 2. The wall thickness of the seal portion 171 on the outlet port 12 side of the outer wall 17 is thicker than the wall thickness of the seal portion 171 on the inlet port 11 side. Thus, the molten resin in the cavity for the outer wall 17 on the inlet port 11 side having a thin wall and providing a high flow resistance of molten resin is made to easily move to the cavity for the outer wall 17 on the outlet port 12 side having a thick wall and providing a low flow resistance of molten resin. Therefore, the supply timing of the molten resin into the cylindrical cavity for the outer wall 17 is balanced between on the inlet port 11 side and on the outlet port 12 side.

As a result, when the molten resin is to be filled in the upper end of the cylindrical cavity for the outer wall 17 to form the seal portion 171, the molten resin is filled over the entire circumference at the same timing. Thus, any merged area of the molten resin is not generated.

Since the molten resin is filled in the seal portion 171 to be formed in the outer wall 17 of the valve chamber 15 at the same timing over the entire circumference and the molten resin does not form any merged area, no weld lines occur.

According to the fluid control valve 100 of the present embodiment, therefore, no weld lines occur in the seal portion 171 formed in the outer wall 17.

According to the fluid control valve 100 of the present embodiment, the lower surface of the valve main body 1 is formed with the resin supply ribs 194A and 194B radially extending from the resin injected part 191 toward the inlet port 11. Thus, more molten resin is supplied to the inlet port 11 side through the resin supply ribs 194A and 194B radially extending from the resin injected part 191. Even if the inflow passage 13 has a large diameter, particularly, more molten resin is allowed to be supplied into the cavity for the outer wall 17 on the inlet port 11 side in which the molten resin flows in a curve by going around the inflow passage 13. Therefore, the supply timing of the molten resin into the cylindrical cavity for the outer wall 17 is balanced between on the inlet port 11 side and on the outlet port 12 side. During supply of molten resin, the leading end of the molten resin becomes almost the same height in the cylindrical cavity for the outer wall 17 at an early stage.

Therefore, the molten resin flowing on the inlet port 11 side and the molten resin flowing on the outlet port 12 side can merge in the cavity for the inner wall 16 and the outer wall 17 at an early stage, and the merged flow can reach the valve seat 161 and the seal portion 171. Thus, no weld lines occur in the valve seat 161 and the seal portion 171.

According to the fluid control valve 100 of the present embodiment, it is possible to more reliably avoid the occurrence of weld lines in the valve seat and others.

According to the fluid control valve 100 of the present embodiment, when the molten resin is filled to form the valve seat 161 and the seal portion 171 during injection molding, the upper end face of the valve seat 161 is completely filled at the same timing over the entire circumference and the upper end face of the seal portion 171 is also completely filled at the same timing over the entire circumference. Thus, no weld lines are generated in the valve seat 161 and the seal portion 171.

The present invention is not limited to the above embodiments and may be embodied in other specific forms without departing from the essential characteristics thereof.

(1) According to the above embodiments, the inner wall 16 is formed with the uniform-thick wall portion 162 between the thick-wall portion 163 and the valve seat 161, and the uniform-thick wall portion 162 is a cylindrical part having a wall thickness thinner than the thin-wall portion 164 on the outlet port 12 side. This uniform-thick wall portion 162 is however not limited to the aforementioned cylindrical shape.

For instance, the uniform-thick wall portion 162 may be formed in a tapered shape tapering from the wall thickness equal to that of the thin-wall portion 164 on the outlet port 12 side. Since such a tapered uniform-thick wall portion 162 has an outer diameter gradually decreasing toward its leading end, but a clearance in a corresponding tapered cavity is uniform over the entire circumference at the same height (in section). With this configuration, the flow resistance of molten resin flowing in the cavity is equal and allowed to be filled uniformly in the cavity. Consequently, the molten resin does not merge in the cavity and thus no weld lines occur.

(2) According to the present embodiment, the outer periphery of the inner wall 16 between the chamber bottom 151 and the stepped portion 165 has an oblong cross section. In the oblong cross section, the inflow passage 13 having a circular cross section is formed at the center of the boss portion. In the oblong cross section formed with the circular cross section, an almost half part on the inlet port 11 side forms the thick-wall portion 163. On the other hand, in the oblong cross section formed with the circular cross section, the other almost half part on the outlet port 12 side forms the thin-wall portion 164. However, the thick-wall portion 163 and the thin-wall portion 164 are not limited to the above shapes.

For instance, the outer shape of the inner wall 16 may be designed to provide any curved cross section such as an elliptic cross section and an oval cross section or any polygonal cross section. Even when the outer shape of the inner wall 16 is selected from such various cross sections, the thick-wall portion has only to be formed on the inlet port side to make the flow velocity of molten resin flowing in the inner wall on the inlet port side relatively faster than that on the outlet port side.

(3) According to the present embodiment, the inflow passage 13 is formed like an almost L shape vertically that extends through the inner wall 16 from its opening side and is bent horizontally to communicate between the inlet port 11 and the valve chamber 15. However, the inflow passage 13 is not limited to the above shape.

For instance, the inflow passage 13 may be formed like an L shape extending through the inner wall 16 by slanting from a midpoint of the inner wall 16 and further extending horizontally. In this case, the inner wall on the outlet port side is formed with a thickness larger on the bottom side of the outflow passage. Thus, the wall thickness difference between the thin-wall portion 164 and the thick-wall portion 163 has to be set larger.

(4) According to the present embodiment, the outer periphery of the seal portion 171 is circular, but not limited to this shape.

Figure 20:
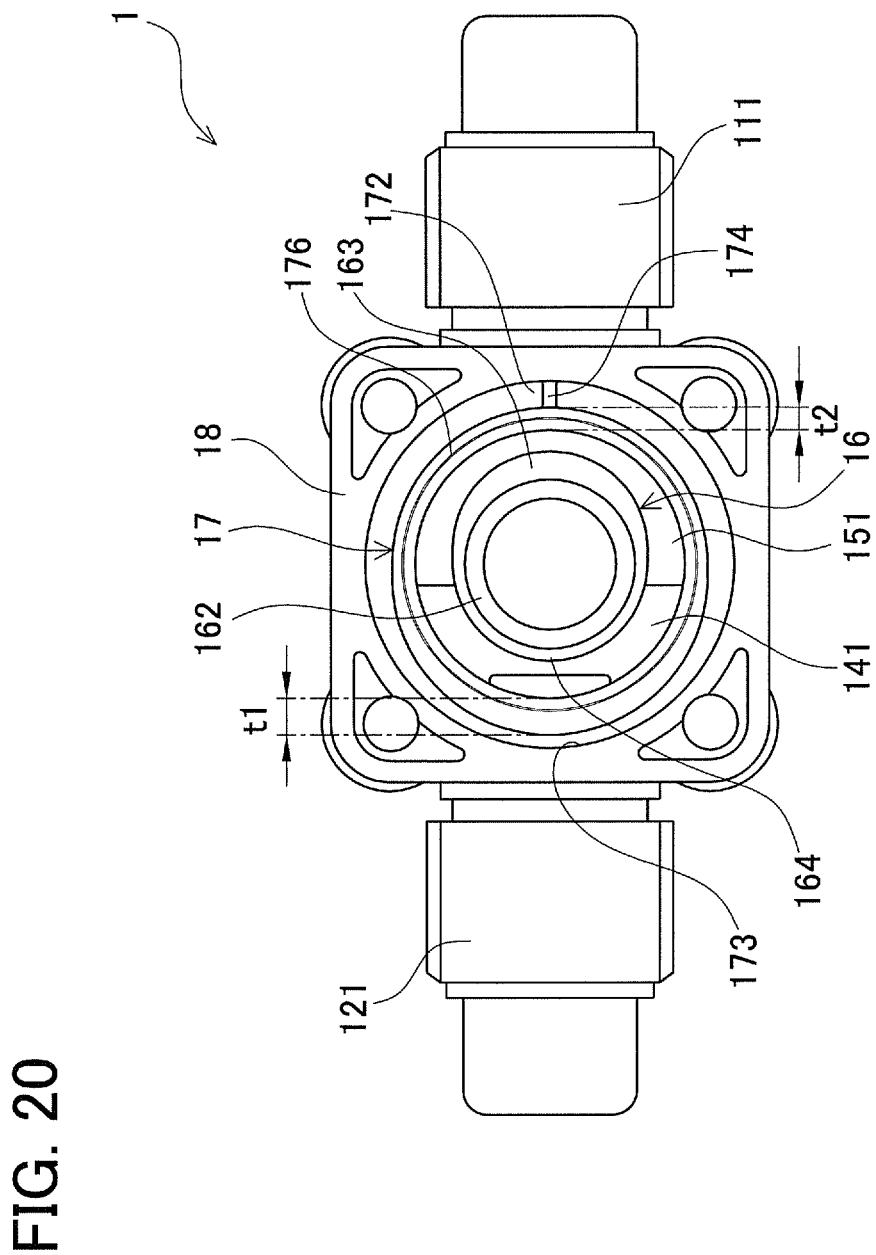
FIG. 20 is a top view (View X) of a modified example of the valve main body shown in FIG. 3.

For instance, as shown in FIG. 20, the outer shape of the seal portion 176 is elliptic so that a wall thickness t1 on the outlet port side is thicker than a wall thickness t2 on the inlet port side. In the cavity for such a seal portion 176, accordingly, the resin flow on the outlet port side becomes relatively faster than the resin flow on the inlet port side. Thus, in the cavity for the seal portion 176, the molten resin flowing on the outlet port side catches up on and merges with the molten resin flowing on the inlet port side, and the merged resin flow can reach the seal surface. This can further prevent the occurrence of weld lines in the seal portion 176.

(5) According to the present embodiment, as shown in FIGS. 2 and 3, the inner wall 16 is formed with the stepped portion 165 facing up at a predetermined height. The inner wall 16 is formed in a cylindrical shape including the thick-wall portion 163 between the chamber bottom 151 and the stepped portion 165, the thick-wall portion 163 has a wall thickness thicker on the inlet port 11 side than on the outlet port 12 side. However, the inner wall 16 is not limited to the above shape.

Figure 21:
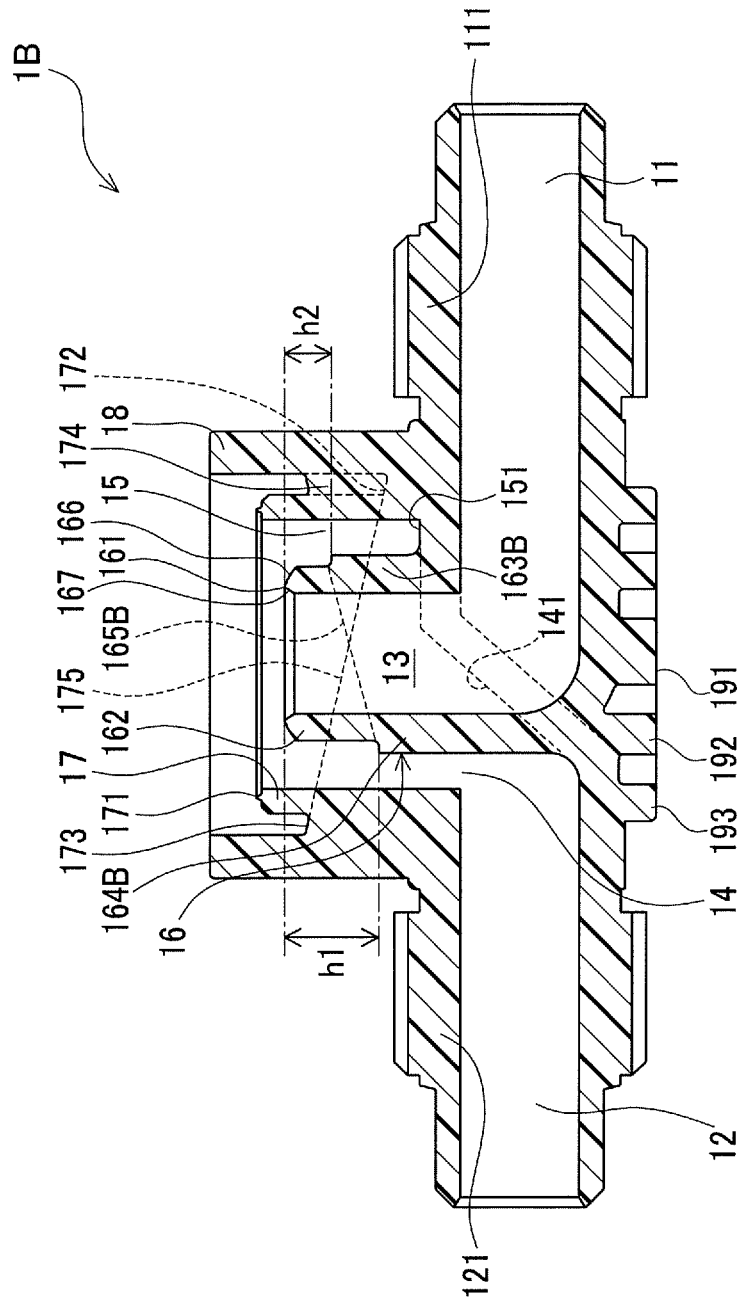
FIG. 21 is a cross sectional view of another modified example of the valve main body shown in FIG. 3.
Figure 22:
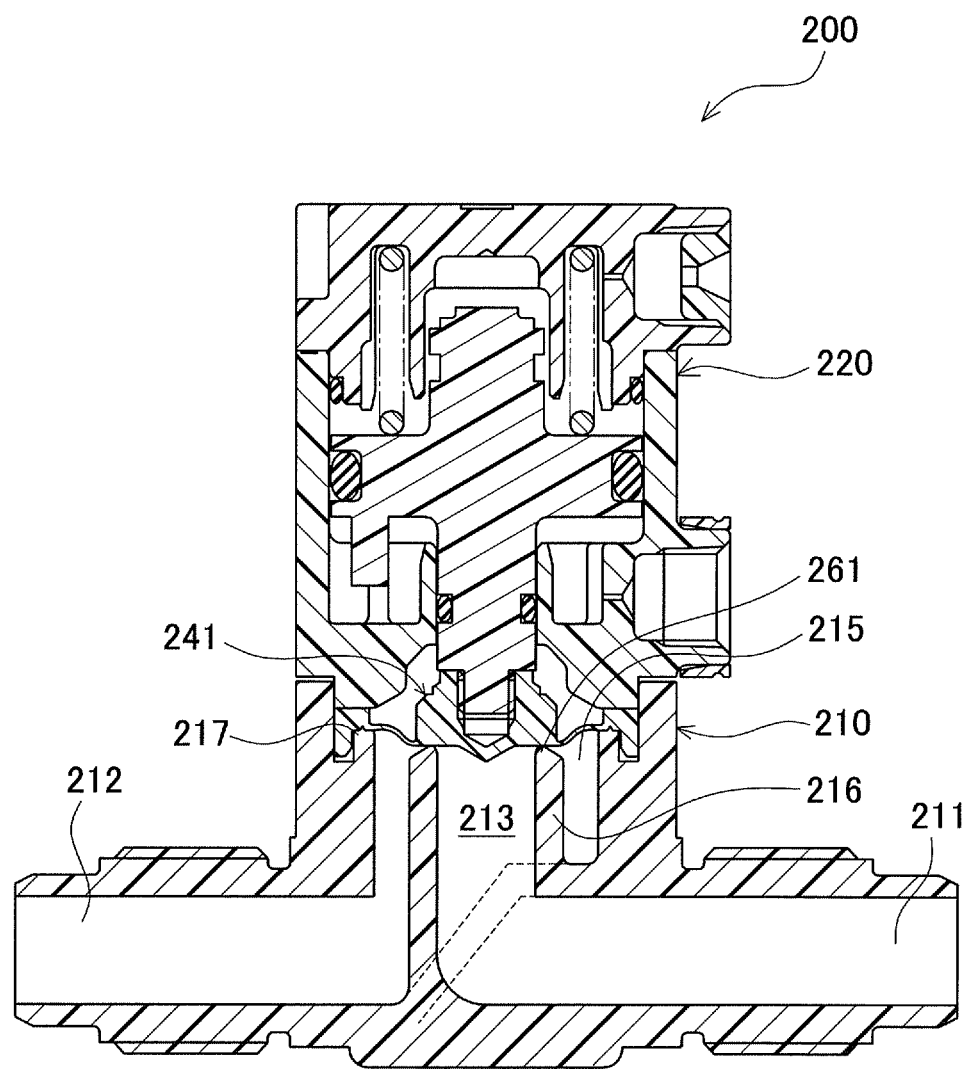
FIG. 22 is a cross sectional view of a conventional fluid control valve in a valve closed state.

For instance, as shown in FIG. 21, the inner wall 16 may be designed so that the wall thickness of the thick-wall portion 163B on the inlet port 11 side is substantially equal to the wall thickness of the thick-wall portion 164B on the outlet port 12 side, and the distance between the valve seat 161 and each of the thick-wall portions 163B and 164B is set so that a distance h2 on the inlet port 11 side is shorter than a distance h1 on the outlet port 12 side. In this case, the stepped portion 165B is an inclined surface sloping downward from the inlet port 11 side to the outlet port 12 side. The uniform-thick wall portion 162 is formed thereon. In the cavity for the inner wall 16, accordingly, the molten resin is supplied relatively more to the inlet port 11 side than to the outlet port 12 side.

Accordingly, when the molten resin flowing on the inlet port 11 side passes through the thick-wall portion 163B, this molten resin catches up on the molten resin flowing in the thick-wall portion 164B on the outlet port 12 side, and the molten resin flowing on the inlet port 11 side in the cylindrical cavity of the inner wall 16 merges with the molten resin flowing on the outlet port 12 side, and then the merged resin flow can reach the valve seat 161 which is a seal surface. After the molten resin passes through the thick-wall portions 163B and 164B, specifically, the molten resin on the inlet port 11 side and the molten resin on the outlet port 12 side can join together to be filled simultaneously in the cylindrical cavity for the inner wall 16.

INDUSTRIAL APPLICABILITY

The present invention is available in particular for a chemical control valve to be used in a cleaning process of a semiconductor manufacturing device.

REFERENCE SINGS LIST

1 Valve main body
2 Valve upper body
3 Mounting plate
4 Valve element, Diaphragm valve element
11 Inlet port
12 Outlet port
13 Inflow passage
14 Outflow passage
15 Valve chamber
16 Inner wall
17 Outer wall
18 Boss portion
100 Fluid control valve, Chemical control valve
161 Valve seat
162 Uniform thickness portion
163 Thick-wall portion
164 Thin-wall portion
165 Stepped portion
163B Thick-wall portion (Inlet port side)
164B Thick-wall portion (Outlet port side)
165B Stepped portion
171, 176 Seal portion
172 Annular inclined groove (Inlet port side)
173 Annular inclined groove (Outlet port side)
191 Resin injected part

What is claimed is:

1. A fluid control valve comprising:
a resin valve main body including an inlet port and an outlet port formed in opposite side surfaces of the valve main body, a valve chamber communicating between the inlet port and the outlet port and opening at a center of an upper surface of the valve main body, and a valve seat provided in an inner wall of the valve chamber;
a valve element arranged to be moved into or out of contact with the valve seat; and
a valve upper body including a drive part to drive the valve element,
an inflow passage being formed like an L shape extending through the inner wall to communicate between the inlet port and the valve chamber via the valve seat, wherein
the inner wall is shaped in a cylindrical form including a thick-wall portion so that a wall thickness of the inner wall is thicker on the inlet port side than on the outlet port side,
the valve main body is provided, at a center of a lower surface, with a resin injected part,
an outer wall of the valve chamber is formed, at an upper end, with an annular seal portion to hold a retainer portion of the valve element between the outer wall and a lower end of the valve upper body, and
an annular groove is formed around an outer circumference of the seal portion so that the groove is deep on the inlet port side and shallow on the outlet port side.

2. The fluid control valve according to claim 1, wherein the valve seat and the seal portion at the upper end of the outer wall of the valve chamber are formed by injection molding in such a way that molten resin is completely filled for an end face of the valve seat at the same timing over an entire circumference and for an end face of the seal portion respectively at the same timing over an entire circumference.

3. The fluid control valve according to claim 1, wherein the seal portion of the outer wall has a wall thickness thicker on the outlet port side than on the inlet port side.

4. The fluid control valve according to claim 1, wherein the inner wall is formed with a uniform-thick wall portion between the thick-wall portion and the valve seat.

5. The fluid control valve according to claim 1, wherein the valve main body is formed, in a lower surface, with a resin supply rib radially extending from the resin injected part toward the thick-wall portion.

6. A fluid control valve comprising:
a resin valve main body including an inlet port and an outlet port formed in opposite side surfaces of the valve main body, a valve chamber communicating between the inlet port and the outlet port and opening at a center of an upper surface of the valve main body, and a valve seat provided in an inner wall of the valve chamber;
a valve element arranged to be moved into or out of contact with the valve seat; and
a valve upper body including a drive part to drive the valve element,
an inflow passage being formed like an L shape extending through the inner wall to communicate between the inlet port and the valve chamber via the valve seat, wherein
the inner wall is shaped in a cylindrical form including a thick-wall portion so that a wall thickness of the inner wall is thicker on the inlet port side than on the outlet port side,
the valve main body is provided, at a center of a lower surface, with a resin injected part,
an outer wall of the valve chamber is formed, at an upper end, with an annular seal portion to hold a retainer portion of the valve element between the outer wall and a lower end of the valve upper body, and the seal portion of the outer wall has a wall thickness thicker on the outlet port side than on the inlet port side.

7. A fluid control valve comprising:
a resin valve main body including an inlet port and an outlet port formed in opposite side surfaces of the valve main body, a valve chamber communicating between the inlet port and the outlet port and opening at a center of an upper surface of the valve main body, and a valve seat provided in an inner wall of the valve chamber;
a valve element arranged to be moved into or out of contact with the valve seat; and
a valve upper body including a drive part to drive the valve element,
an inflow passage being formed like an L shape extending through the inner wall to communicate between the inlet port and the valve chamber via the valve seat,
an outer wall of the valve chamber is formed, at an upper end, with an annular seal portion to hold a retainer portion of the valve element between the outer wall and a lower end of the valve upper body,
an annular groove is formed around an outer circumference of the seal portion so that the groove is deep on the inlet port side and shallow on the outlet port side, and
the valve main body is provided, at a center of a lower surface, with a resin injected part.

8. The fluid control valve according to claim 7, wherein the valve main body is formed, in a lower surface, with a resin supply rib radially extending from the resin injected part toward the inlet port side.

9. The fluid control valve according to claim 7, wherein the valve seat and the seal portion are formed by injection molding in such a way that molten resin is completely filled for an end face of the valve seat at the same timing over an entire circumference and for an end face of the seal portion respectively at the same timing over an entire circumference.

10. A fluid control valve comprising:
a resin valve main body including an inlet port and an outlet port formed in opposite side surfaces of the valve main body, a valve chamber communicating between the inlet port and the outlet port and opening at a center of an upper surface of the valve main body, and a valve seat provided in an inner wall of the valve chamber,
a valve element arranged to be moved into or out of contact with the valve seat; and
a valve upper body including a drive part to drive the valve element,
an inflow passage being formed like an L shape through the inner wall to communicate the inlet port with the valve chamber via the valve seat,
wherein an outer wall of the valve chamber is formed, at an upper end, with an annular seal portion to hold a retainer portion of the valve element between the outer wall and a lower end of the valve upper body,
the seal portion of the outer wall has a wall thickness thicker on the outlet port side than on the inlet port side, and
the valve main body is provided, at a center of a lower surface, with a resin injected part.

11. The fluid control valve according to claim 10, wherein the valve main body is formed, in a lower surface, with a resin supply rib radially extending from the resin injected part toward the inlet port side.

12. The fluid control valve according to claim 10, wherein the valve seat and the seal portion are formed by injection molding in such a way that molten resin is completely filled for an end face of the valve seat at the same timing over an entire circumference and for an end face of the seal portion respectively at the same timing over an entire circumference.

* * * * *